(12) United States Patent
Ueshima

(10) Patent No.: US 7,554,545 B2
(45) Date of Patent: Jun. 30, 2009

(54) DRAWING APPARATUS OPERABLE TO DISPLAY A MOTION PATH OF AN OPERATION ARTICLE

(75) Inventor: Hiromu Ueshima, Kusatsu (JP)

(73) Assignee: SSD Company Limited, Shiga (JP)

( * ) Notice: Subject to any disclaimer, the term of this patent is extended or adjusted under 35 U.S.C. 154(b) by 577 days.

(21) Appl. No.: 10/980,988

(22) Filed: Nov. 4, 2004

(65) Prior Publication Data

US 2005/0140645 A1 Jun. 30, 2005

(30) Foreign Application Priority Data

Nov. 4, 2003 (JP) .......................... P.2003-374429

(51) Int. Cl.
*G06T 11/20* (2006.01)
*G09G 5/00* (2006.01)
(52) U.S. Cl. ...................... 345/441; 345/156
(58) Field of Classification Search ................ 345/158, 345/179, 156, 441; 715/863
See application file for complete search history.

(56) References Cited

U.S. PATENT DOCUMENTS

| | | | | | |
|---|---|---|---|---|---|
| 5,515,079 | A | * | 5/1996 | Hauck | 345/157 |
| 5,652,630 | A | * | 7/1997 | Bertram et al. | 348/734 |
| 5,982,352 | A | * | 11/1999 | Pryor | 345/156 |
| 6,070,205 | A | | 5/2000 | Kato et al. | |
| 6,181,343 | B1 | * | 1/2001 | Lyons | 715/850 |
| 6,486,874 | B1 | * | 11/2002 | Muthuswamy et al. | 345/173 |
| 7,098,891 | B1 | * | 8/2006 | Pryor | 345/158 |
| 2002/0119819 | A1 | | 8/2002 | Kunzle et al. | |
| 2004/0063480 | A1 | | 4/2004 | Wang | |
| 2004/0104894 | A1 | * | 6/2004 | Tsukada et al. | 345/168 |

FOREIGN PATENT DOCUMENTS

| | | |
|---|---|---|
| JP | 10-307790 | 11/1998 |
| JP | 2002-263370 | 9/2002 |
| JP | 2003-114754 | 4/2003 |

OTHER PUBLICATIONS

Innis, HA, "Animated Cursor Pointer", May 1992, IBM TDB, vol. 24 No. 12, p. 209-210.*
Office Action dated Aug. 9, 2006 for U.S. Appl. No. 10/972,284 (9 pages).
Patent Abstracts of Japan, Publication No. 2002-263370 dated Sep. 17, 2002 (2 pages).
Patent Abstracts of Japan, Publication No. 2003-114754 dated Apr. 18, 2003 and English Translation(16 pages).
Patent Abstracts of Japan, Publication No. 10-307790 dated Nov. 17, 1998 and English Translation (60 pages).

* cited by examiner

*Primary Examiner*—Ryan R Yang
(74) *Attorney, Agent, or Firm*—Osha • Liang LLP

(57) ABSTRACT

The drawing apparatus images the operation article by intermittently emitting light to the operation article to derive a location of the operation article on the screen. The cursor is displayed at the location of the operation article on the screen. Therefore, the cursor follows movement of the operation article. Then, the star images are displayed on the motion path of the cursor. In this way, a motion path of the operation article can be displayed by operating the operation article in the air.

12 Claims, 30 Drawing Sheets

Fig. 18

| Size Selective Object | Storage Location Information of The Animation Table |
|---|---|
| ID0 | address 0 |
| ID1 | address 1 |
| ID2 | address 2 |

Fig. 19

| Storage Location of The Animation | Segment Number | Duration Information | Next Segment | Block Size |
|---|---|---|---|---|
| ad0 (address 0) | 1 | 1 | next | 8 Pixels × 8 Pixels |
| | ... | ... | ... | |
| | 4 | 1 | top | |
| ad1 (address 1) | 1 | 1 | next | 8 Pixels × 8 Pixels |
| | ... | ... | ... | |
| | 4 | 1 | top | |
| ad2 (address 2) | 1 | 1 | next | 8 Pixels × 8 Pixels |
| | ... | ... | ... | |
| | 4 | 1 | top | |

# DRAWING APPARATUS OPERABLE TO DISPLAY A MOTION PATH OF AN OPERATION ARTICLE

This application claims foreign priority based on Japanese Patent application No. 2003-374429, filed Nov. 4, 2003, the contents of which is incorporated herein by reference in its entirety.

BACKGROUND OF THE INVENTION

1. Field of the Invention

The present invention relates to a drawing apparatus which displays a motion path of an operation article on a screen of a display device, and the related techniques thereof.

2. Description of the Related Art

The following handwriting information input device is described in a patent publication (Jpn. unexamined patent publication No. 2003-114754).

When an operation for writing or drawing a letter or a pattern is carried out on a virtual writing plane in three-dimensional space or on two-dimensional surface by using a tip of the handwriting information input device, detected values about an acceleration and an angular velocity accompanied to writing motion are outputted from an acceleration sensor and an angular velocity sensor arranged in a tip part of the input device, converted into digital signals by a D/A converter, and stored in a memory device. When a connector is inserted into a slot for a memory card of a personal computer to be connected electrically, the detected values stored in the memory device are read out to the personal computer, and data processing is allowed in an image recognizing part.

However, since the above mentioned handwriting input device comprises various sensors, the memory device and electronic circuits, the production cost is high, and it causes failure. In addition, it is hard to say that the handwriting input device is user-friendly because it is heavy. Especially, since the hand writing input device is operated in the air, the problem of the weight is serious.

SUMMARY OF INVENTION

In view of the foregoing, it is an object of the present invention to provide a drawing apparatus and the related methods which shows a motion path of an operation article through a display device by operating the simple operation article in the air.

In accordance with the present invention, a drawing apparatus comprises: a stroboscope operable to direct light onto a operation article at a predetermined interval; an image capturing device operable to capture an image of said operation article with and without light emitted from said stroboscope, and generate a lighted image signal and a non-lighted image signal which represent image signals corresponding to said operation article with and without light emitted from said stroboscope; a differential signal generating unit operable to generate a differential signal between said lighted image signal and said non-lighted image signal; a state information calculating unit operable to calculate state information of said operation article on the basis of said differential signal; a following object control unit operable to control display of a following object in accordance with said state information of said operation article so that said following object follows motion of said operation article; and a drawing control unit operable to control drawing on a display device on the basis of a motion path of said following object.

In accordance with this configuration, the drawing apparatus capture the images of the operation article by emitting light intermittently to the operation article so as to derive the state information of the operation article. Accordingly, it is not necessary to provide the operation article with a power supply circuit and electric circuits. Therefore, it is possible to display an image corresponding to the motion path of the following object by operating the simple constructed operation article in the air. In other words, since the following object follows motion of the operation article, it is possible to display the image corresponding to a motion path of the operation article on the display device. In addition, since it is not necessary to provide the operation article with a power supply circuit and electric circuits, it is possible to improve operationality and reliability of the operation article and also reduce the cost.

In above drawing apparatus, the drawing control unit displays the motion path of said following object with a plurality of predetermined images. In accordance with this configuration, it is possible to display a decorated motion path of the following object.

The drawing control unit performs animation of each predetermined image. In accordance with this configuration, it is possible to display more decorated motion path of the following object.

In above drawing apparatus, the drawing control unit displays the motion path of said following object by a line. In accordance with this configuration, the user can draw lines arbitrary by only operating the operation article in the air.

In above drawing apparatus, the drawing control unit controls drawing operation and undrawing operation on the basis of area information obtained as one of said state information. In accordance with this configuration, the user can control the state between pen-up and pen-down by bringing the operation article closer or farther to the drawing apparatus.

For example, the drawing control unit performs the drawing operation when said area information exceeds a predetermined threshold value, and does not perform the drawing operation when said area information falls below the predetermined threshold value.

In accordance with this configuration, when the area information as the state information of the operation article exceeds the predetermined threshold value, in other words, in the state of a distance between the operation article and the imaging unit being less than a constant value, the drawing operation is performed (pen-down state). On the other hand, when the area information as the state information of the operation article does not exceed the predetermined threshold value, in other words, in the state of a distance between the operation article and the imaging unit being more than the constant value, the drawing operation is not performed (pen-up state). In this way, the user can control drawing and undrawing operation by bringing the operation article closer or further to the imaging unit. In other words, the user can control drawing and undrawing operation intuitively as if the user were drawing with an ordinal pen.

Furthermore, for example, the drawing control unit drawing control unit does not perform the drawing operation when said area information falls below a first predetermined threshold value, and once said area information falls below the first predetermined threshold value, said drawing control unit does not perform the drawing operation until said area information exceeds a second predetermined threshold value, and wherein said first predetermined threshold value is smaller than said second predetermined threshold value.

In accordance with this configuration, the drawing process is not performed (the state does not become pen-down) until the area information as the state information of the operation article exceeds not the first predetermined value, but the second threshold value once the area information as the state information of the operation article falls below the first threshold value and the state becomes pen-up where the drawing process is not performed. In other words, once the state becomes pen-up by the first threshold value, the state does not become pen-down unless the operation article is brought to the border corresponding to the second threshold value which is closer to the imaging unit than the border corresponding to the first threshold value. In this way, since the pen-up state and the pen-down state are not divided by only one border, it is possible to avoid malfunction by operating the operation article around a border. In other words, in case where the pen-up state and the pen-down state are divided by only one border, the state might keep changing between drawing operation and undrawing operation when the user operates the operation article around the border.

In Above drawing apparatus, the state information calculated by said state calculation unit is location information of said operation article on said display device. In accordance with this configuration, display of the following object is controlled on the basis of the location information of the operation article.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 18 is a view showing a relation between the identification number of the size selective object and the storage location information of the animation table.

FIG. 19 is a view showing an example of the animation table pointed by the storage location information of FIG. 18 to animate the star image.

DESCRIPTION OF THE PREFERRED EMBODIMENTS

In what follows, an embodiment of the present invention will be explained in conjunction with the accompanying drawings. Similar elements are given similar references throughout the respective drawings.

Figure 1:
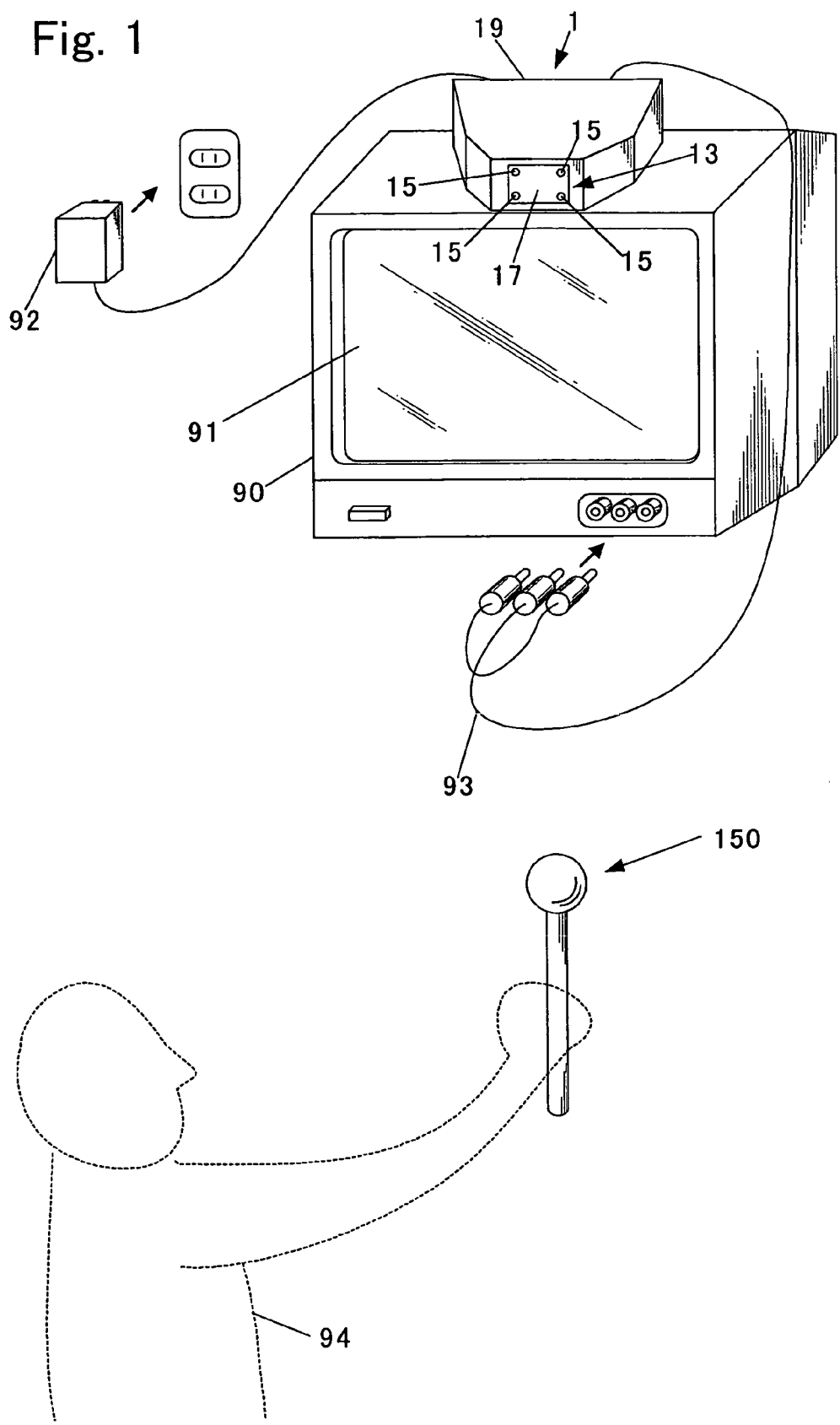
FIG. 1 is a view showing the overall configuration of a drawing system in accordance with the embodiment of the present invention.

FIG. 1 is a view showing the overall configuration of a drawing system in accordance with the embodiment of the present invention. As illustrated in FIG. 1, this game system includes a drawing apparatus 1, an operation article 150, and a television monitor 90.

An imaging unit 13 is installed in a housing 19 of the drawing apparatus 1. The imaging unit 13 has four infrared-emitting diodes 15 and an infrared filter 17. Light emitting portions of the infrared-emitting diodes 15 are exposed from the infrared filter 17.

An AC adapter 92 supplies the drawing apparatus 1 with direct current power voltage. However, instead of using the AC adaptor 92, the game apparatus 1 can be supplied with the direct current power voltage from batteries (not shown).

A screen 91 is provided on the front surface of the television monitor 90. The television monitor 90 and the drawing apparatus 1 are connected by an AV cable 93. For example, the drawing apparatus 1 is set up on the television monitor 90 as illustrated in FIG. 1.

When a user 94 turns on a power switch (not shown) provided on back of the drawing apparatus 1, a drawing screen and a cursor is displayed on the screen 91. When the user 94 operates the operation article 150 and moves the cursor on the screen 91, the motion path of the operation article 150 becomes visible on the screen 91. Meanwhile, operating the operation article 150 does not mean pushing switches or operating analog sticks but moving the operation article 150 itself.

Each of the infrared-emitting diodes 15 intermittently emits infrared-light. The infrared-light as emitted by the infrared-emitting diodes 15 is reflected by reflecting sheets (hereinafter described) provided on the operation article 150, and then the return light is input to an image capturing device (hereinafter referred) placed behind the infrared filter 17. In this way, the image of the operation article 150 is captured intermittently. Therefore, the drawing apparatus 1 can acquire intermittent image signals of the operation article 150 moved by the user 94. The drawing apparatus 1 analyzes the image signals, and performs drawing operation. The reflecting sheet used in this embodiment is, for example, a retroreflective sheet.

Figure 2:
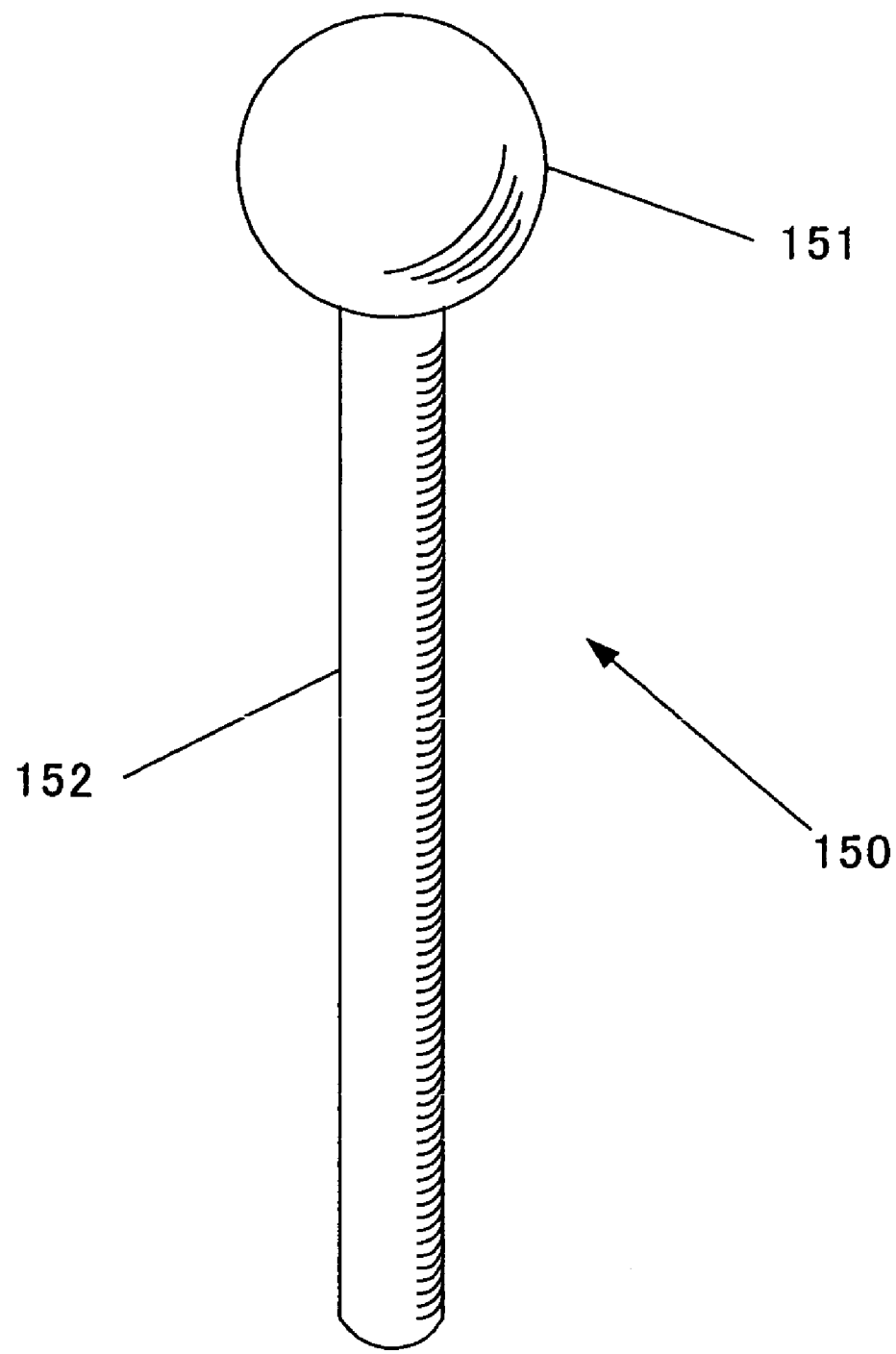
FIG. 2 is a perspective view of the operation article of FIG. 1.

FIG. 2 is a perspective view of the operation article 150 of FIG. 1. As Illustrated in FIG. 2, the operation article is provided with a reflecting ball 151 fixed on the top of a stick 152. The reflecting ball 151 reflects the infrared-light emitted by infrared emitting diodes 15. The reflecting ball 151 will be described in detail.

Figure 3:
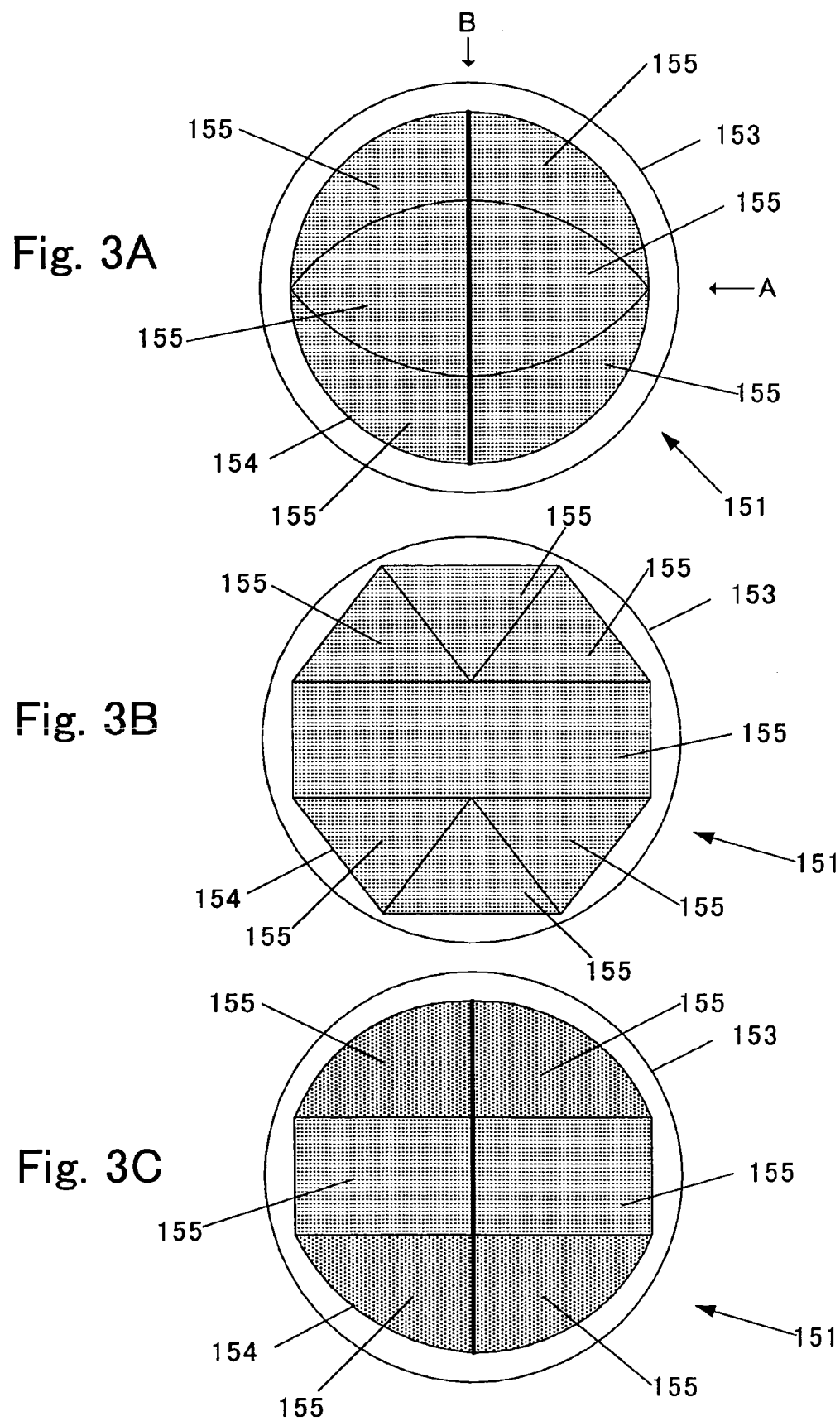
FIG. 3A is a top view of the reflecting ball 151 of FIG. 2.
FIG. 3B is a side view from the direction of an arrow A of FIG. 3A.
FIG. 3C is a side view from the direction of an arrow B of FIG. 3A.

FIG. 3A is a top view of the reflecting ball 151 of FIG. 2. FIG. 3B is a side view from the direction of an arrow A of FIG. 3A. FIG. 3C is a side view from the direction of an arrow B of FIG. 3A.

As illustrated in FIG. 3A to 3C, the reflecting ball 151 consists of a transparent (including translucent, colored transparent and colorless transparent) outer spherical shell 153 and an inner spherical shell 154, wherein the inner spherical shell 154 is secured inside of the outer spherical shell 153. Reflecting sheets 155 are provided on the surface of the inner spherical shell 154. These reflecting sheets 155 reflect the infrared-light coming from infrared-emitting diodes 15.

Figure 4:
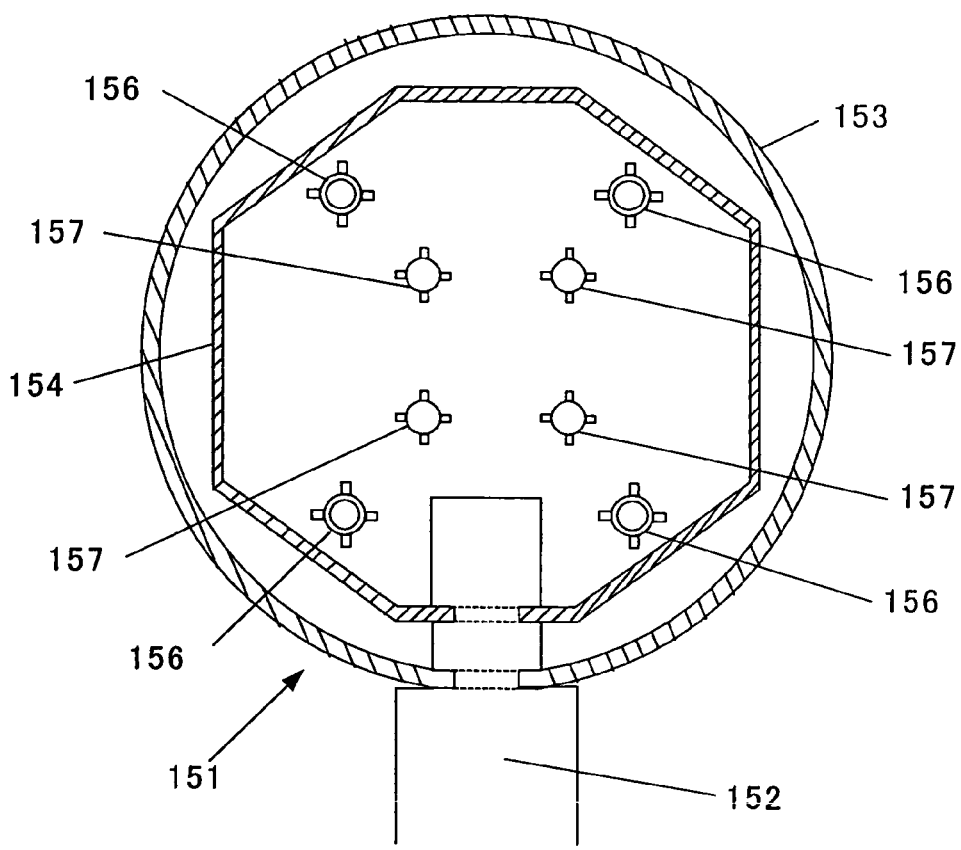
FIG. 4 is a vertical cross-sectional view of the reflecting ball of FIG. 2.

FIG. 4 is a vertical cross-sectional view of the reflecting ball 151 of FIG. 2. As illustrated in FIG. 4, the outer spherical shell 153 is formed by two outer semispherical shells fixed together by bosses 156 and screws (not shown). The inner spherical shell 154 is formed by two inner semispherical shells fixed together by bosses 157 inside of the outer spherical shell 153. Meanwhile, the stick 152 is set in and fixed with the reflecting ball 151. More specifically, the stick 152 is nipped between two outer semispherical shells constructing the outer spherical shell 153 and also nipped between two inner semispherical shells constructing the inner spherical shell 154, then the outer semispherical shells are fixed by the bosses 156 and the screws, and then the inner semispherical shells are fixed by the bosses 157.

Figure 5:
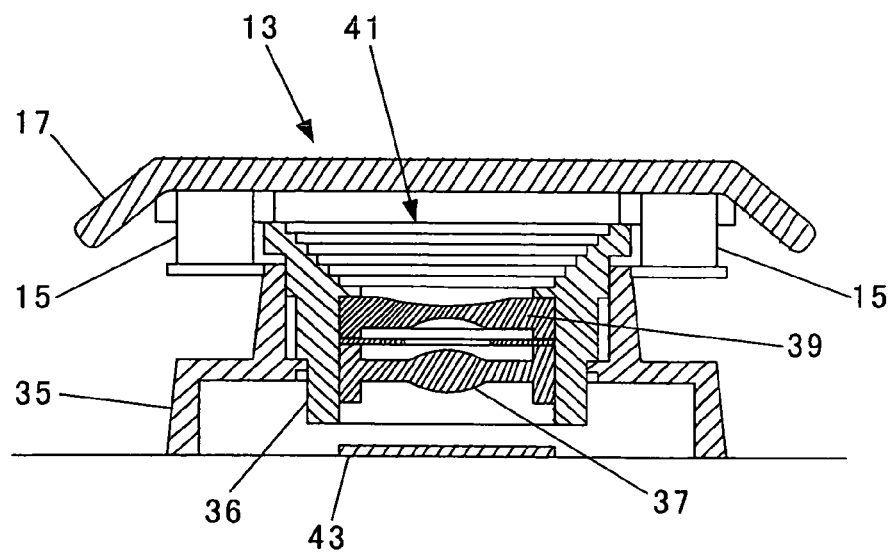
FIG. 5 is a cross-sectional view of an example of the imaging unit of FIG. 1.

FIG. 5 is a cross-sectional view of an example of the imaging unit 13 of FIG. 1. As shown in FIG. 5, this imaging unit 13 includes a unit base 35 which is, for example, formed of plastic, and a supporting cylindrical part 36 is attached inside of the unit base 35. In addition, an inverted-cone-shaped (or trumpet-shaped) aperture 41 is formed in the upper side of the supporting cylindrical part 36. An optical system including a concave lens 39 and converging lens 37 is attached inside of the supporting cylindrical part 36 so that it is located under the inverted-cone-shaped aperture 41. For example, the concave lens 39 and the converging lens 37 are formed of lucent plastic. An image sensor 43 as an image capturing device is firmly fixed under the converging lens 37. Therefore the image sensor 43 can pick up an image in response to incident light passing through the concave lends 39 and the converging lends 37 from the aperture 41.

The image sensor 43 is a low-resolution CMOS image sensor (for example, 32 pixels×32 pixels, gray scale). However, this image sensor 43 can be replaced by a higher resolution image sensor or other device such as CCD. In what follows, it is assumed that the image sensor 43 consists of 32 pixels×32 pixels. Furthermore, the unit base 35 has several (4 in this embodiment) infrared-emitting diodes 15 which flash upwardly. The upside of the imaging unit 13 is lighted by infrared-light from these infrared-emitting diodes 15. Meanwhile, the infrared filter 17 (which transmits only infrared-light) is arranged in a manner to bring it cover the aperture 41. Moreover, as explained later, the infrared-emitting diodes 15 repeat flash and un-flash alternately so that they can serve as a stroboscope. The term "stroboscope" is a generic term, which indicates an apparatus that intermittently irradiates light to a moving object. The above-mentioned image sensor 43 can, therefore, image an article that moves within a scope of the imaging unit 13, or the operation article 150 in this embodiment. Referring to after-mentioned FIG. 8, the stroboscope consists of the infrared-emitting diodes 15, a LED drive circuit 75 and a high speed processor 200.

The imaging unit 13 is installed in the housing 19 and its light receiving surface is inclined prescribed angle (for example, 90 degrees) from horizontal-plane. In addition, the scope of the image sensor 43 is a range of 60 degrees, which depends on the concave lens 39 and the converging lends 37.

Figure 6:
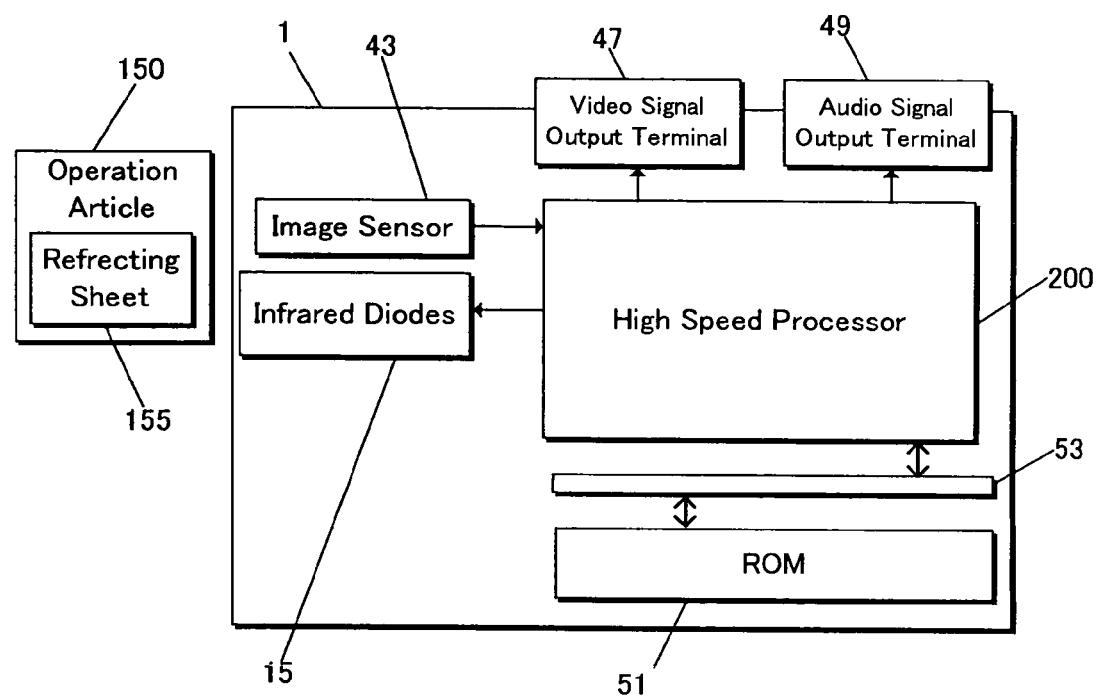
FIG. 6 is a view showing the electrical structure of the drawing apparatus of FIG. 1.

FIG. 6 is a view showing the electrical structure of the drawing apparatus 1 of FIG. 1. As shown in FIG. 6, the drawing apparatus 1 include the image sensor 43, the infrared-emitting diodes 15, a video signal output terminal 47, an audio signal output terminal 49, the high speed processor 200, a ROM (read only memory) 51 and a bus 53.

The high speed processor 200 is connected with the bus 53. Furthermore, the bus 53 is connected with the ROM 51. Therefore, the high speed processor 200 can access the ROM 51 via the bus 53 so that the high speed processor 200 can read a drawing program stored in the ROM 51 and execute the drawing program. In addition, the high speed processor 200 reads image data and sound data stored in the ROM 51 and processes them. Then, the high speed processor 200 generates a video signal and an audio signal, and outputs them to the video output terminal 47 and the sound output terminal 49.

The operation article 150 is exposed to infrared-light coming from the infrared-emitting diodes 15 and reflects the infrared-light by the reflecting sheets 155. The return light from reflecting sheets 155 is detected by the image sensor 43, and then the image sensor 43 outputs an analog image signal of the reflecting sheets 155. The analog image signal from the image sensor 43 is converted into a digital image signal by an A/D converter (hereinafter referred) built in the high speed processor 200. The same process is also executed when the infrared-emitting diodes 15 do not flash. Then the high speed processor 200 analyzes these digital image signals and reflects the result to drawing processing.

Figure 7:
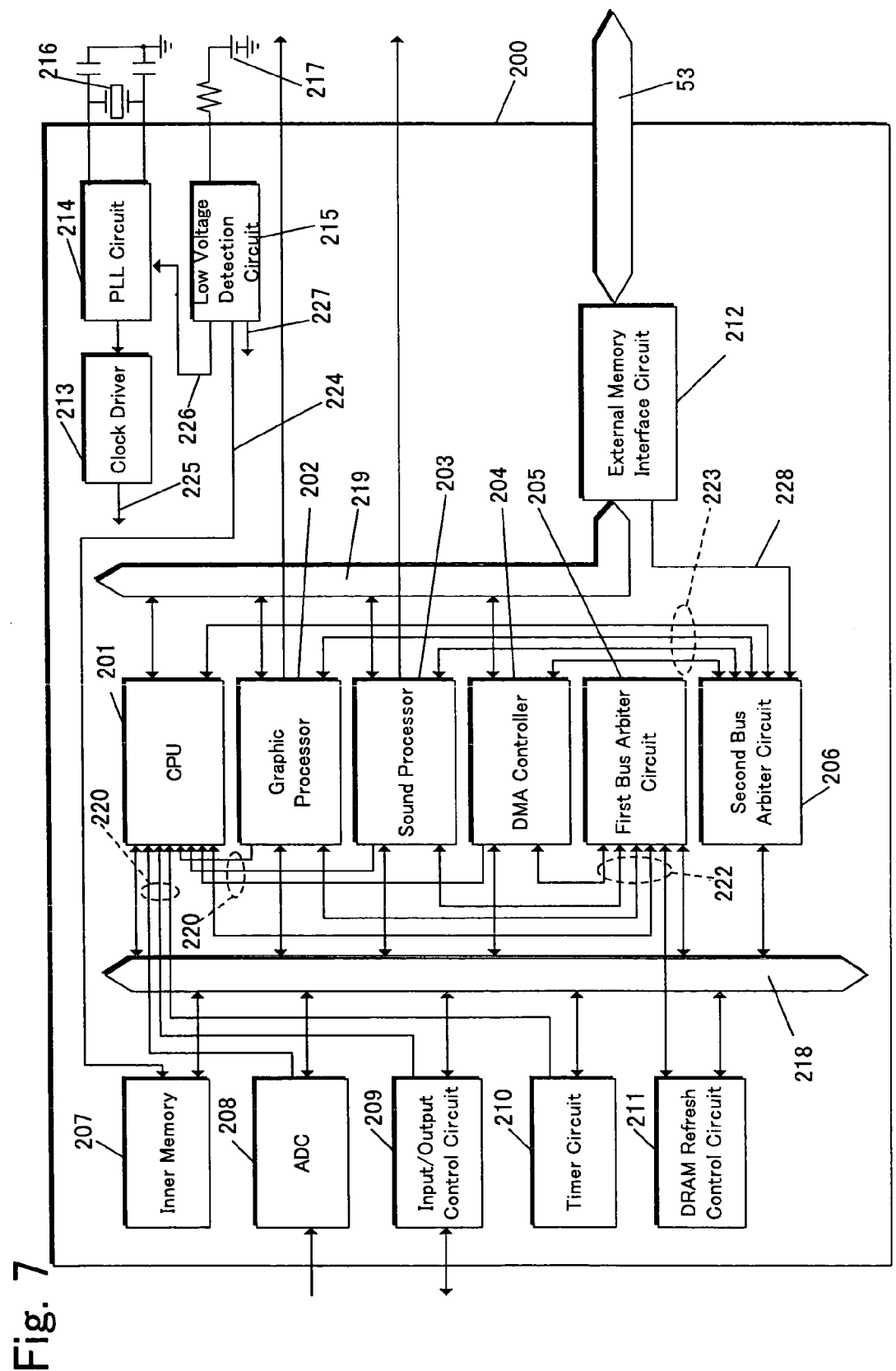
FIG. 7 is a block diagram of the high speed processor of FIG. 6.

FIG. 7 is a block diagram of the high speed processor 200 of FIG. 6. As shown in FIG. 7, this high speed processor 200 includes a CPU (central processing unit) 201, a graphic processor 202, a sound processor 203, a DMA (direct memory access) controller 204, a first bus arbitrator circuit 205, a second bus arbitrator circuit 206, an inner memory 207, an A/D converter (ADC: analog to digital converter) 208, an I/O (input and output) control circuit 209, a timer circuit 210, a DRAM (dynamic random access memory) refresh control circuit 211, an external memory interface circuit 212, a clock driver 213, a PLL (phase-locked loop) circuit 214, a low voltage detector circuit 215, a first bus 218 and a second bus 219.

The CPU 201 performs various operations and controls the overall system in accordance with a program stored in the memory (the inner memory 207, or the ROM 51). In addition, the CPU 201 is a bus master of the first bus 218 and the second bus 219, and able to access resources connected with the each bus.

The graphic processor 202 is a bus master of the first bus 218 and the second bus 219. The graphic processor 202 generates a video signal on the basis of the data stored in the inner memory 207 or ROM 51, and then output the video signal to the video signal output terminal 47. The graphic processor 202 is controlled by the CPU 201 via the first bus 218. In addition, the graphic processor 202 has the functionality of generating an interrupt request signal 220 to the CPU 201.

The sound processor 203 is a bus master of the first bus 218 and second bus address bus 219. The sound processor generates an audio signal on the basis of the data stored in the inner memory 207 or ROM 51, and then output the audio signal to the audio signal output terminal 49. The sound processor 203 is controlled by the CPU 201 trough the first bus 218. In addition, the sound processor 203 has the functionality of generating an interrupt request signal 220 to the CPU 201.

The DMA controller 204 controls data transfer from the ROM 51 to the inner memory 207. Also, the DMA controller 204 has the functionality of outputting, to the CPU 201, an interrupt request signal 220 indicative of the completion of the data transfer. The DMA controller 204 is a bus master of the first bus 218 and second bus 219. In addition, the DMA controller 204 is controlled by the CPU 201 via the first bus 218.

The inner memory 207 may be implemented with appropriate one of a mask ROM, an SRAM (static random access memory) and a DRAM in accordance with the system requirements. If data in SRAM has to be kept by a battery, a battery 217 is provided. In the case where a DRAM is used, the so called refresh cycle is periodically performed to maintain the data contained therein.

The first bus arbitrator circuit 205 accepts a first bus request signal from each bus master of the first bus 218, and performs arbitration, and then issues a first bus grant signal to each bus master. Each bus master is allowed to access the first bus after receiving the first bus grant signal. In FIG. 7, the first bus request signal and the first bus grant signal are referred as first bus arbitration signals 222.

The second bus arbitrator circuit 206 accepts a second bus request signal from each bus master of the second bus 219, and performs out arbitration, and then, issues a second bus grant signal to each bus master. Each bus master is allowed to access the second bus after receiving the second bus grant signal. In FIG. 7, the second bus request signal and the second bus grant signal are referred as second bus arbitrator signals 223.

The input/output control circuit 209 serves to perform input and output operations of input/output signals to enable the communication with external input/output device(s) and/or external semiconductor device(s). The read and write operations of input/output signals are performed by the CPU 201 through the first bus 218. Moreover, the Input/output control circuit 209 has the functionality of generating an interrupt request signal 220 to the CPU 201.

A LED control signal "LEDC" which controls the infrared-emitting diodes 15 is output from this I/O control circuit 209.

The timer circuit 210 has the functionality of generating an interrupt request signal 220 to the CPU 201 at time intervals as preset. The setting of the timer circuit 210 such as the time interval is performed by the CPU 201 through the first bus 218.

The ADC 208 converts an analog input signal into a digital signal. The digital signal is read by the CPU 201 via the first bus 218. Moreover, the ADC 208 has the functionality of generating an interrupt request signal 220 to the CPU 201.

This ADC 208 receives analog pixel data from the image sensor 43 and converts the analog pixel data into digital pixel data.

The PLL circuit 214 generates a high frequency clock signal by multiplication of the sinusoidal signal as obtained from a quartz oscillator 216.

The clock driver 213 amplifies the high frequency clock signal as received from the PLL circuit 214 to sufficient signal level to provide the clock signal to each function block.

The low voltage detector circuit 215 monitors the power voltage "Vcc" of a system, and issues the reset signal 226 of the PLL circuit 214 and the reset signal 227 of entire system when the power voltage falls below a certain voltage. In addition, in the case where the inner memory 207 comprises an SRAM and needs to maintain data by the power supply from the battery 217, the low voltage detector 215 has the functionality of issueing a battery back-up control signal 224 when the power voltage "Vcc" falls below the certain voltage.

The external memory interface circuit 212 has the functionality of connecting the second bus 219 to the external bus 53 and issuing a bus cycle completion signal 228 of the second bus 219 to control the length of the bus cycle of the second bus.

The DRAM refresh cycle control circuit 211 periodically and unconditionally gets the ownership of the first bus 218 to perform the refresh cycle of the DRAM at certain intervals. Needless to say, the DRAM refresh cycle control circuit 211 is provided in case where the inner memory 207 includes a DRAM.

Hereafter, with reference to FIG. 8 to FIG. 10, a configuration for inputting the pixel data from the image sensor 43 to the high speed processor 200 will be explained in detail.

Figure 8:
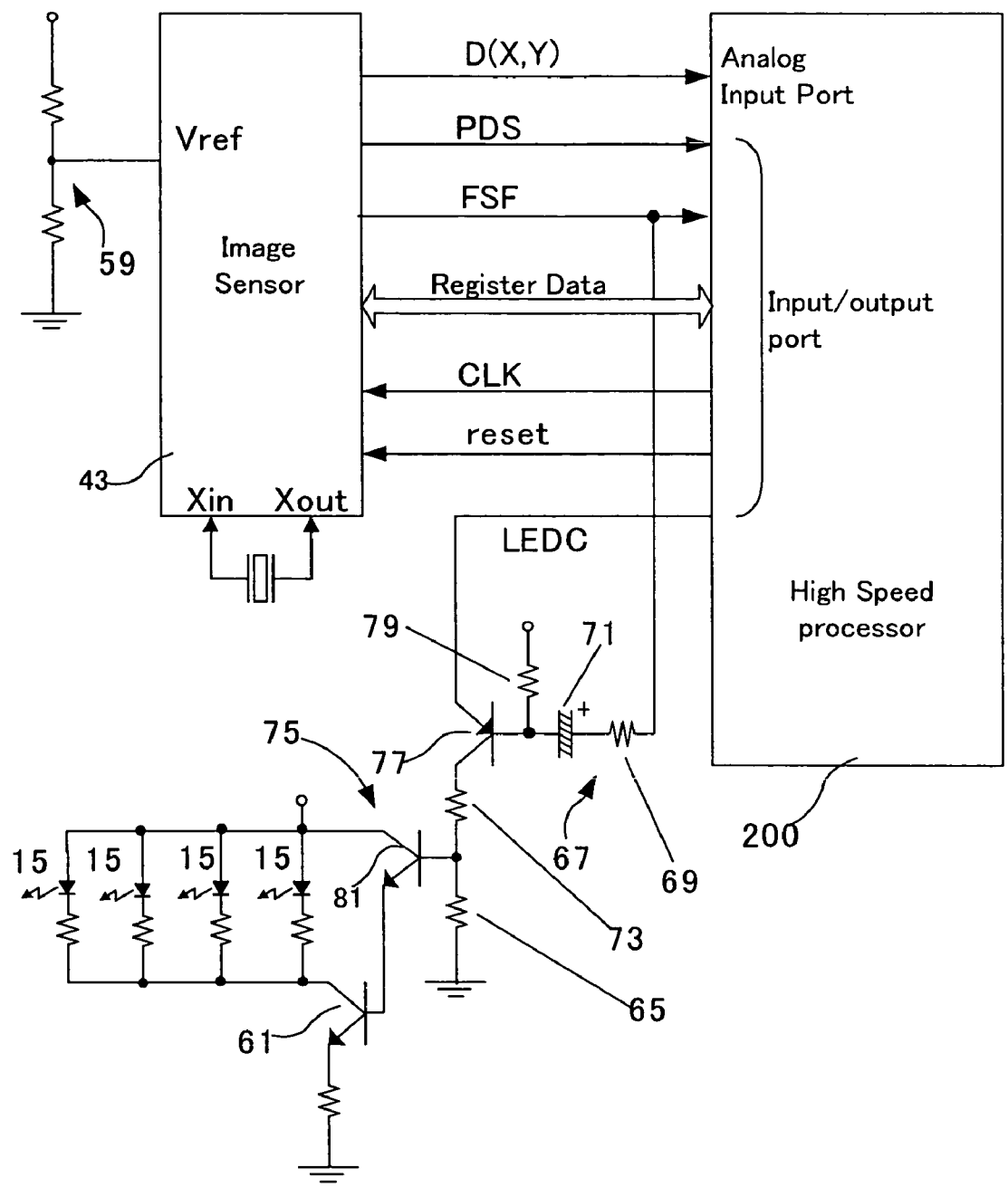
FIG. 8 is a circuit diagram showing the configuration for inputting the pixel data from the image sensor to the high speed processor of FIG. 6, and a LED driver circuit.

FIG. 8 is a circuit diagram showing the configuration for inputting the pixel data from the image sensor 43 to the high speed processor 200 of FIG. 6, and a LED driver circuit. FIG. 9 is a timing chart illustrating the process for inputting the pixel data from the image sensor 43 to the high speed processor 200. FIG. 10 is an enlarged view of a portion of the timing chart shown in FIG. 9.

As shown in FIG. 8, pixel data D (X, Y) is input to the analog input port of the high speed processor 200 since the image sensor 43 outputs the pixel data D (X, Y) as an analog signal. The analog input port is connected with the ADC 208 in this high speed processor 200. Therefore, the high speed processor 200 obtains the pixel data converted into digital data.

The middle point of above-mentioned analog pixel data D (X, Y) is determined on the basis of reference voltage applied to a reference voltage terminal "Vref" of the image sensor 43. Therefore, a reference voltage generating circuit 59 comprising a voltage dividing circuit is provided, and this circuit 59 constantly applies the reference voltage to the reference voltage terminal "Verf".

Each digital signal to control the image sensor 43 is input to the Input/output ports of the high speed processor 200, and also output from the Input/output ports. Each input/output port is a digital port operable to control input and output operation, and connected with the input/output control circuit 209 of the high speed processor 200.

More specifically, a reset signal "reset" to reset the image sensor 43 is output from the input/output port of the high speed processor 200, and transmitted to the image sensor 43. A pixel data strobe-signal "PDS" and a frame status flag signal "FSF" are output from the image sensor 43 to the input/output ports of the high speed processor 200.

Figure 9:
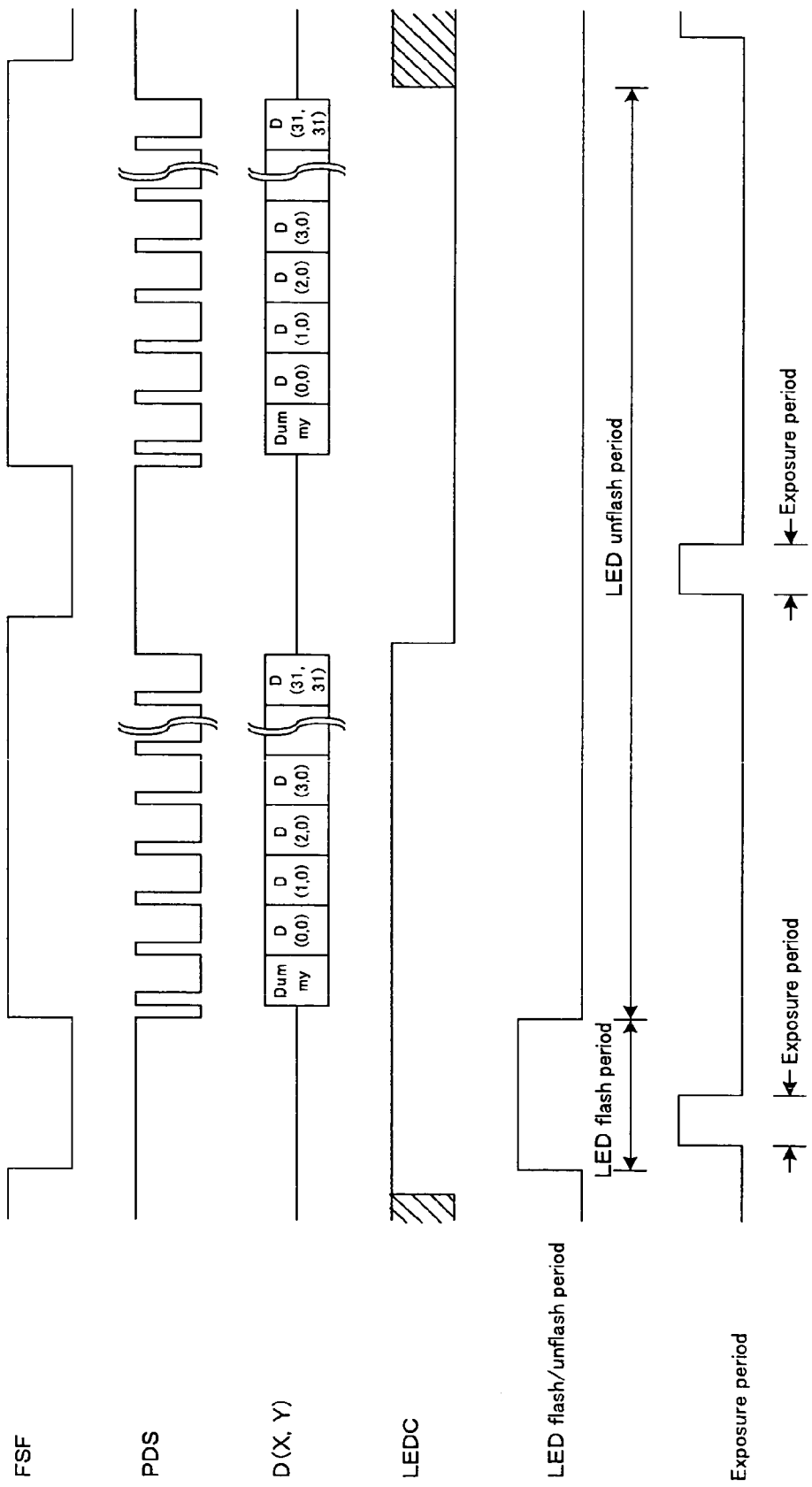
FIG. 9 is a timing chart illustrating the process for inputting the pixel data from the image sensor to the high speed processor.

As shown in FIG. 9, the pixel data strobe signal "PDS" is a strobe signal to read above-mentioned each pixel data D (X, Y) from the image sensor 43. The frame status flag signal "FSF" indicates a state of the image sensor 43, and as shown in FIG. 9, it determines an exposure period of the image sensor 43. In other words, a low-level period of the frame status flag signal "FSF" as illustrated in FIG. 9 shows the exposure period, and a high-level period shows an unexposure period.

In addition, the high speed processor 200 outputs a command (or a command and data) as register data to be set to a control register (not shown) of the image sensor 43 via the input/output ports. Furthermore, the high speed processor 200 outputs a register setting clock "CLK" which repeats a low-level period and a high-level period alternately. The register data and the register setting clock "CLK" are sent to the image sensor 43.

As shown in FIG. 8, the four infrared-emitting diodes 15 are connected in parallel. As hereinbefore referred, these infrared-emitting diodes 15 are arranged so as to encompass the image sensor 43 and emit infrared-light to the direction same as a viewpoint direction of the image sensor 43 to irradiate the operation article 150 with the infrared-light.

These infrared-emitting diodes 15 are turned on or turned off by the LED driver circuit 75. The LED driver circuit 75 receives the above-mentioned frame status flag signal "FSF", and then, the signal "FSF" is applied to a base terminal of a PNP transistor 77 via a differentiation circuit 67 consisting of a resistor 69 and a capacitor 71. In addition, the base terminal of the PNP transistor 77 is connected with a pull-up resistor 79, and is normally pulled up to high level. When the frame status flag signal "FSF" becomes low level, the low-level signal "FSF" is input to the base terminal via the differentiation circuit 67. Therefore, the PNP transistor 77 is—turned on only when the level of the flag signal "FSF" is low.

An emitter terminal of the PNP transistor 77 is grounded via resistors 73 and 65. The connecting point of the emitter resistances 73 and 65 is connected with a base terminal of a NPN transistor 81. A collector terminal of this NPN transistor 81 is connected to anodes of the infrared-emitting diodes 15 in common. An emitter terminal of the NPN transistor 81 is connected to a base terminal of a NPN transistor 61 directly. Moreover, a collector terminal of the NPN transistor 61 is connected to cathodes of the infrared-emitting diodes 15 in common. An emitter terminal of the NPN transistor 61 is grounded.

This LED driver circuit 75 turns on the infrared-emitting diodes 15 only when the LED control signal "LEDC" which is output from the input/output port of the high speed processor 200 is active (high-level) and also the level of the frame status flag signal "FSF" from the image sensor 43 is low.

As shown in FIG. 9, the PNP transistor 77 is turned on while the level of the frame status flag signal "FSF" is low (there is actually a time-lag caused by a time constant of the differentiation circuit 67). Therefore, when the LED control signal "LEDC" illustrated in FIG. 9 is set to a high level by the high speed processor 200, the electric potential at the base terminal of the NPN transistor 81 becomes a high level. As a result, this transistor 81 is turned on. Then, when the transistor 81 is turned on, the transistor 61 is also turned on. Therefore, a current passes through each infrared-emitting diodes 15 and the transistor 61 from a power supply (described as a small circle in FIG. 8), and consequently the infrared-emitting diodes 15 flash as described in FIG. 9.

The LED driver circuit 75 turns on the infrared-emitting diodes 15 only while the LED control signal "LEDC" illustrated in FIG. 9 is active, and also the level of the frame status flag signal "FSF" is low. This means that the infrared-emitting diodes 15 flash only during the exposure period of the image sensor 43 (see FIG. 9).

Therefore, it is possible to restrain unnecessary power consumption. Besides, if the flag signal "FSF" retains its low-level because of overrun of the image sensor 43, the transistor 77 will be turned off after a predefined period and also the infrared-emitting diodes 15 will be turned off after the predefined period because the frame status flag signal "FSF" is coupled by the capacitor 71.

As described above, it is possible to set and change the exposure period of the image sensor 43 arbitrarily and freely by controlling the flame status signal "FSF".

In addition, it is possible to set and change a light emitting cycle (or the flash period and the unflash period) of the infrared-emitting diodes 15 (or the stroboscope) arbitrarily and freely by controlling the frame status flag signal "FSF" and/or the LED control signal "LEDC".

As already mentioned, when the operation article 150 is irradiated the infrared-light from the infrared-emitting diodes 15, the image sensor 43 is exposed to the return light from the operation article 150. Accordingly, in response to it, the above-mentioned pixel data D (X,Y) is output from the image sensor 43. More specifically, as shown FIG. 9, when the level of the frame status flag signal "FSF" is high (the unflash period of the infrared-emitting diodes 15), the image sensor 43 outputs the analog pixel data D (X, Y) in synchronization with the pixel data strobe "PDS".

The high speed processor 200 obtains the digital pixel data from the ADC 208 while monitoring the frame status flag signal "FSF" and the pixel data strobe "PDS".

Figure 10:
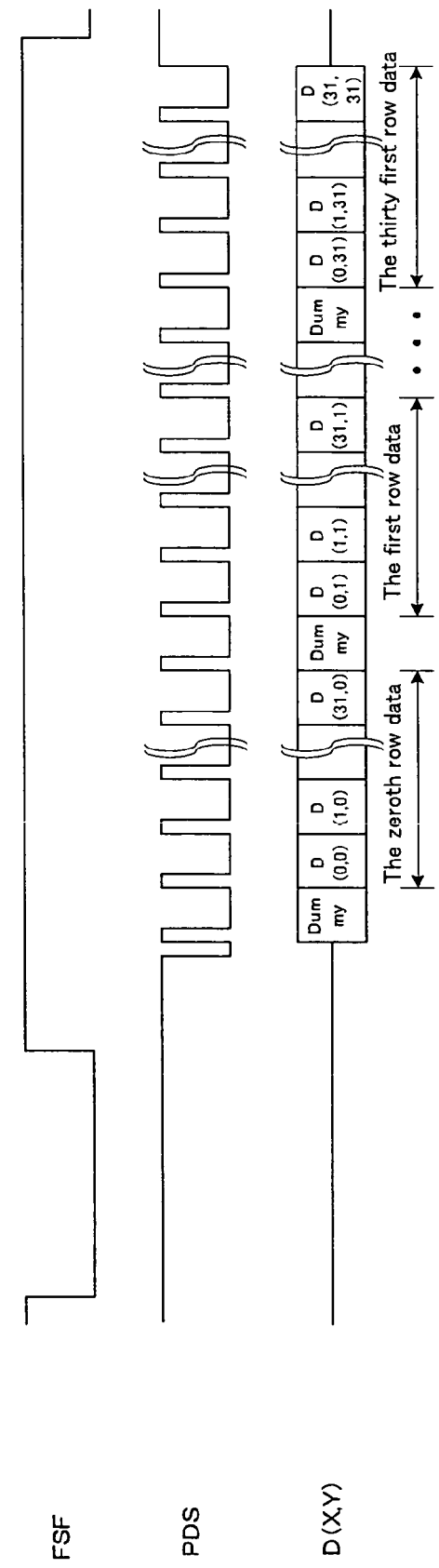
FIG. 10 is an enlarged view of a portion of the timing chart shown in FIG. 9.

As shown in FIG. 10, the pixel data D (X, Y) is output sequentially in order of row, for example, the zeroth row, the first row, . . . and the thirty first row. As hereinafter referred, the first one pixel of each row is dummy data.

In what follows, drawing operation performed by the drawing apparatus 1 will be explained with reference to examples.

Figure 11:
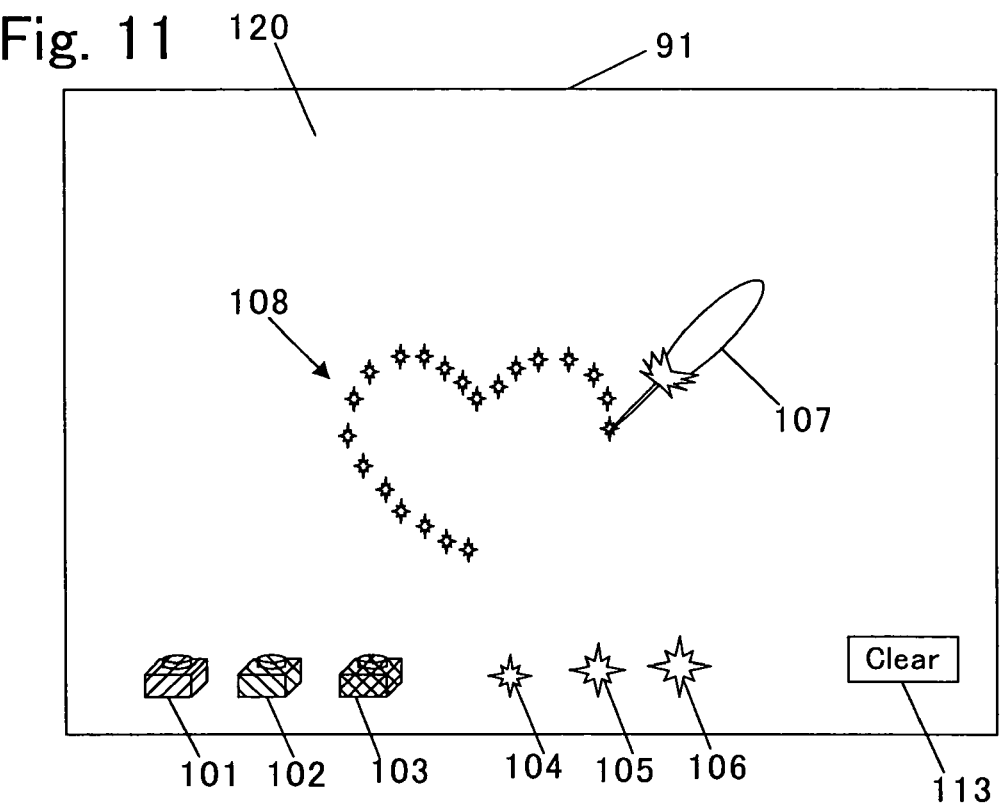
FIG. 11 is a view showing an example of the drawing performed by the drawing apparatus of FIG. 1.

FIG. 11 is a view showing an example of the drawing performed by the drawing apparatus 1 of FIG. 1. As illustrated in FIG. 11, a drawing screen 120, a drawing cursor 107, color selective objects 101 to 103, size selective objects 104 to 106 and a clear button 113 are displayed on the screen 91. The drawing cursor 107 indicates location of the operation article 150 on the screen, and follows motion of the operation article 150. When the user 94 operates the operation article 150 to move the drawing cursor 107, twinkling star images 108 are displayed on a motion path of the drawing cursor 107.

Since the drawing cursor 107 follows motion of the operation article 150, the motion path of the drawing cursor 107 is similar to the actual motion path of the operation article 150 in real space. Therefore, the twinkling star images 108 are displayed on almost the same line as the actual motion path of the operation article 150 operated by the user 94 in real space.

In this way, since the star images 108 are displayed on the motion path of the cursor 107, the user 94 can not only draw figures but also write letters, numbers and marks.

Pen-down and pen-up processing will be explained. Only when a distance "L" between the image sensor 43 and the operation article 150 is L<La, the star images 108 are displayed on the motion path of the drawing cursor 107 (pen-down state). Incidentally, it is possible to set an arbitrary value to the constant number "La". For example, it is possible to determine from one's own experiences. On the other hand, when the distance L between the image sensor 43 and the operation article 150 is larger than the constant number "La", the twinkling star images 108 are not displayed (pen-up state). Therefore, the user 94 keeps the operation article 150 away from the image sensor 43 when not drawing. While the pen-up state, a different cursor image is displayed on the screen 91 so that the user 94 can easily recognize whether or not the cursor is for drawing.

The cursor-displayed while the pen-up state is called an undrawing cursor (not shown). However, both the drawing cursor 107 and the undrawing cursor are called "cursor 107" except when they need to be distinguished. In addition, since the cursor 107 follows motion of the operation article 150, it can be called a following object.

The color selective objects 101 to 103 are used to change color of the star images 108. For example, when the user 94 brings the cursor 107 to a predetermined area containing the color selective object 101, the star images 108 turn blue. When the user 94 brings the cursor 107 to a predetermined area containing the color selective object 102, the star images 108 turn red. When the user 94 brings the cursor 107 to a predetermined area containing the color selective object 103, the star images 108 turn yellow.

The size selective objects 104 to 106 are used to change a size of the star images 108. When the user 94 brings the cursor 107 to a predetermined area containing the size selective object 104, the star images 108 become predefined small size. When the user 94 brings the cursor 107 to a predetermined area containing the size selective object 105, the star images 108 become predefined middle size. When the user 94 brings the cursor 107 to a predetermined area containing the size selective object 106, the star images 108 become predefined big size.

The clear button 113 is used to erase all displayed star images 108 and make the drawing screen 120 blank. When the user 94 brings the cursor 107 to a predetermined area containing the clear button 113, all displayed star images 108 are erased.

The cursor 107, the color selective objects 101 to 103 and the size selective objects 104 to 106 consist of a single or several sprite(s). One sprite comprises a pixel set and its shape is oblong. Incidentally, the sprite can be arranged at any arbitrary position on the screen 91. The cursor 107, the color selective objects 101 to 103 and the size selective objects 104 to 106 are sometimes called "object" (or object image).

Figure 12:
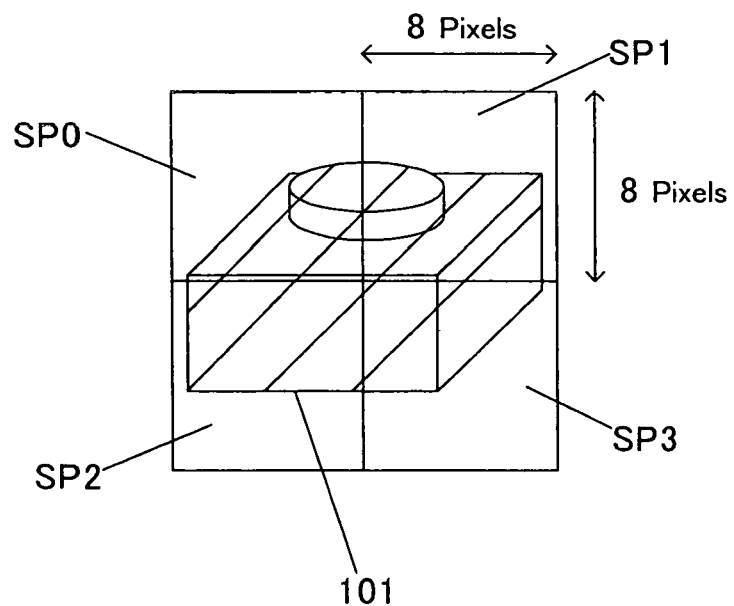
FIG. 12 is a view for explaining sprites constructing an object displayed on the screen.

FIG. 12 is a view for explaining sprites constructing an object displayed on the screen 91. For example, as illustrated in FIG. 12, the color selective object 101 shown in FIG. 11 is composed of 4 sprites sp0 to sp3. For example, each sprite SP0 to SP3 consists of 16 (width)×16 (height) pixels. For example, when the color selective object 101 is arranged on the screen 91, a coordinate where the center of the upper left sprite sp0 is arranged is designated. Coordinates where each center of sprites SP1 to SP3 should be arranged are calculated on the basis of the designated coordinate and the size of each sprite SP0 to SP3.

Next, the drawing screen 120 will be explained. First, a background screen will be explained.

Figure 13:
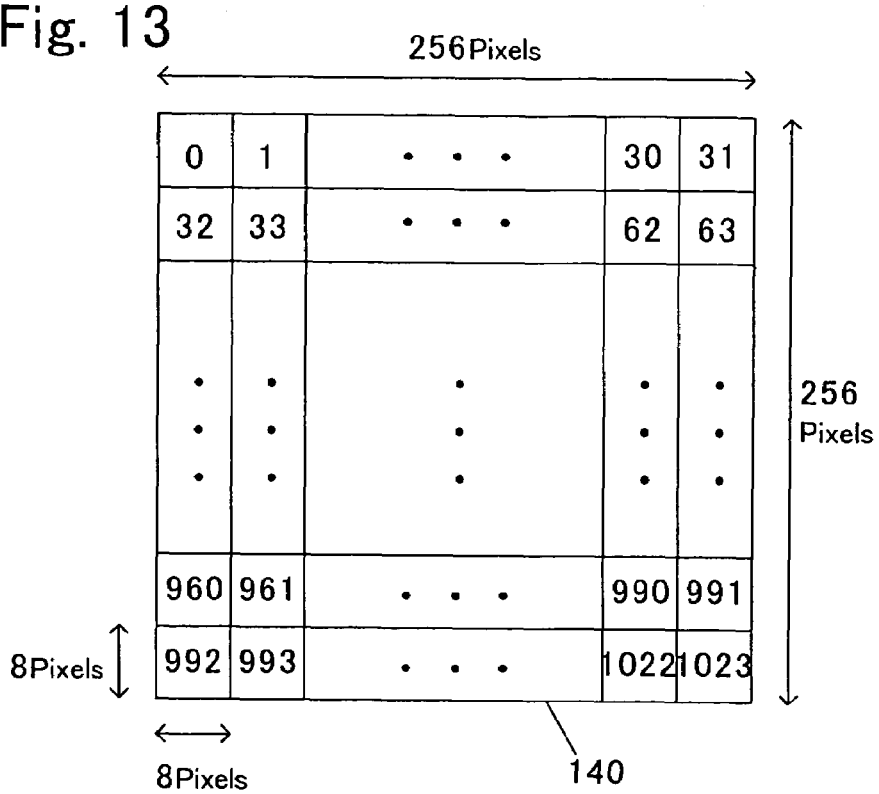
FIG. 13 is a view for explaining the background screen displayed on the screen of the television monitor of FIG. 1.

FIG. 13 is a view for explaining the background screen displayed on the screen 91 of the television monitor 90 of FIG. 1. For example, as illustrated in FIG. 13, the background screen 140 is formed by 32×32 blocks "0" to "1023". For example, each block "0" to "1023" is a square element consisting of 8×8 pixels. Array PA[0] to PA[1023] and array CA[0] to CA[1023] corresponding to the blocks "0" to "1023" are provided. The blocks "0" to "1023" are sometimes called "block(s) B", the array PA[0] to PA[1023] are sometimes called "array PA", and the array CA[0] to CA[1023] are sometimes called "array CA".

Storage location information of pixel pattern data (or data designating a pixel pattern) of each block "B" is assigned to corresponding array PA. The pixel pattern data consists of color information of each pixel constructing the block "B". Incidentally, color palette information (or information designating a color palette) and a depth value of each block "B" are assigned to corresponding array CA. The color palette consists of certain number of color information items. The depth value indicates a depth position of a pixel, and if a plurality of pixels overlap each other only the pixel having the largest depth value is displayed. Since the size of the screen 91 is 256 pixels(width)×224 pixels(height), the area of 256 pixels×224 pixels of the background screen 140 is displayed on the screen 91. The area of the background screen 140 is the area of the drawing screen 120. Therefore, the drawing screen 120 is formed on the basis of data assigned to the array PA and the array CA.

Next, drawing process performed by the drawing apparatus 1 will be explained.

Figure 14:
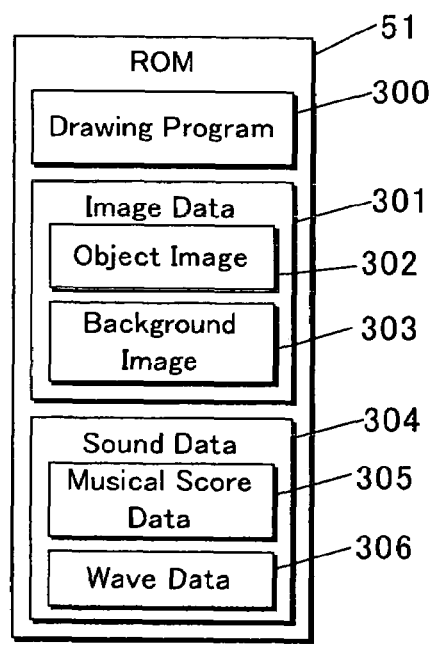
FIG. 14 is a schematic representation of a program and data stored in ROM of FIG. 6.

FIG. 14 is a schematic representation of a program and data stored in ROM 51 of FIG. 6. As illustrated in FIG. 14, the ROM 51 stores a drawing program 300, image data 301, and sound data 304. The image data 301 includes object image data 302 (including the cursor 107, the color selective objects 101 to 103 and the size selective objects 104 to 106) and background image data 303 (including the drawing screen 120). The object image data 302 and the background image data 303 consist of necessary data for image generation including pixel pattern data. The sound data 304 includes musical score data 305 and wave data (or sound source data) 306. The high speed processor 200 executes the drawing program 300 stored in the ROM 51 and uses the image data 301 and the sound data 304.

Next, main process which the high speed processor 200 executes will be explained.

[Pixel Data Aggregation Acquiring Process]

The CPU 201 obtains the digital pixel data converted from the analog pixel data D (X,Y) as output from the image sensor 43, and then assigns it to an array P[X] [Y]. The CPU 201 assigns conclusively all digital pixel data to array P[X] [Y]. Horizontal direction of the image sensor 43 is defined as X-axis, and vertical direction of the image sensor 43 is defined as Y-axis.

[Differential Data Calculating Process]

The CPU 201 calculates a difference between pixel data P[X] [Y] with and without light emitted from the infrared-emitting diodes 15, and then assigns it to an array Dif[X] [Y]. The CPU 201 assigns conclusively all differences to the array Dif[X] [Y]. Next, effects from calculating the difference will be explained with reference to drawings. In this embodiment, the pixel data indicates luminance. Therefore, the difference (or differential data) also indicates luminance.

Figure 15A:
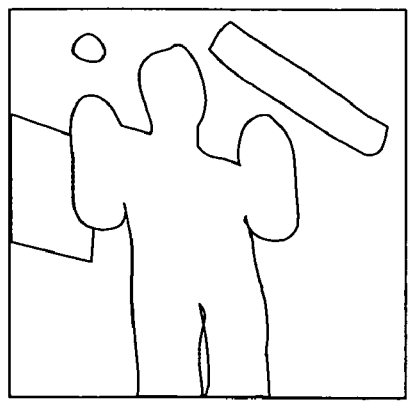
FIG. 15A is a view showing an example of an image which is captured by a general image sensor and is not applied any special process.
Figure 15B:
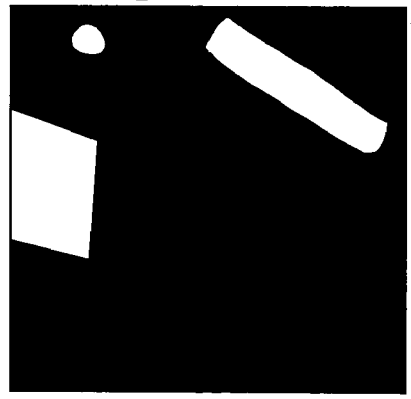
FIG. 15B is a view showing an example of an image based on a result of level-discriminating the image of FIG. 15A with a predetermined threshold value.
Figure 15C:
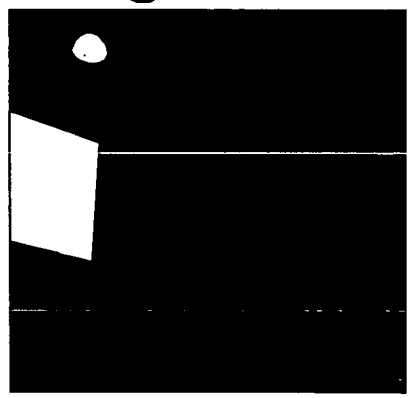
FIG. 15C is a view showing an example of an image based on a result of level-discriminating an image which is obtained through the infrared filter while the infrared-emitting diodes emit infrared light.
Figure 15D:
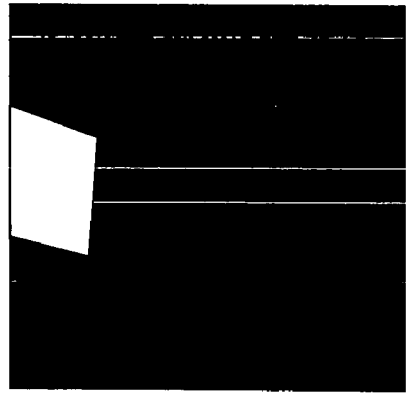
FIG. 15D is a view showing an example of an image based on a result of level-discriminating an image which is obtained through the infrared filter while the infrared-emitting diodes do not emit the infrared light.
Figure 15E:
FIG. 15E is a view showing an example of an image based on a difference between the image with light emitted and the image without light emitted from the infrared-emitting diodes.

FIG. 15A is a view showing an example of an image which is captured by a general image sensor and is not applied any special process. FIG. 15B is a view showing an example of an image based on a result of level-discriminating the image of FIG. 15A with a predetermined threshold value. FIG. 15C is a view showing an example of an image based on a result of level-discriminating an image which is obtained through the infrared filter 17 while the infrared-emitting diodes 15 emit infrared light. FIG. 15D is a view showing an example of an image based on a result of level-discriminating an image which is obtained through the infrared filter 17 while the infrared-emitting diodes 15 do not emit the infrared light. FIG. 15E is a view showing an example of an image based on a difference between the image with light emitted (shown in FIG. 15C) and the image without light emitted (shown in FIG. 15D) from the infrared-emitting diodes 15.

The image shown in FIG. 15A should be displayed in gray scale, but it is omitted to do so for convenience. In the FIG. 15A to FIG. 15E, the reflecting sheets 155 of the operation article 150 are captured by the image sensor 43. As illustrated in FIG. 15A, when the general image sensor (corresponding to the image sensor 43 of FIG. 5) picks up an image of the operation article 150 by means of a stroboscope under a general light source in a general condition room, the general image sensor picks up not only the operation article 150 but also all other things in the room and light sources such as a fluorescent lamp, an incandescent lamp (not shown), and sunlight (a window). As illustrated in FIG. 15B, it is possible to cut out an image(s) having lower luminance than predetermined luminance by level-discrimination. However, the image shown in FIG. 15B still includes high luminance images such as the light sources.

As shown in FIG. 5, by using the infrared filter 17, only the infrared-light falls on the image sensor 43. As a result, as shown in FIG. 15C, it is possible to cut out the fluorescent lamp which has little infrared-light. However, the image shown in FIG. 18C still includes the sunlight (the window) and the incandescent lamp (not shown).

Because of this, the CPU 201 calculates the difference between the image (shown in FIG. 15C) with light emitted and the image (shown in FIG. 15D) without light emitted from the infrared-emitting diodes 15. As a result of the calculation, the image as shown in FIG. 15E is acquired. Comparing to the image of FIG. 15A, it is obvious that the image shown in FIG. 15E based on the differential data calculating process includes only the image of the operation article 150.

Because of above-mentioned reasons, the CPU 201 acquires the differential data between the pixel data with and without light emitted.

[Target Point Extracting Process]

The CPU 201 calculates a coordinate of a target point of the operation article 150 on the basis of the differential data Dif[X] [Y]. This will be explained in detail.

Figure 16:
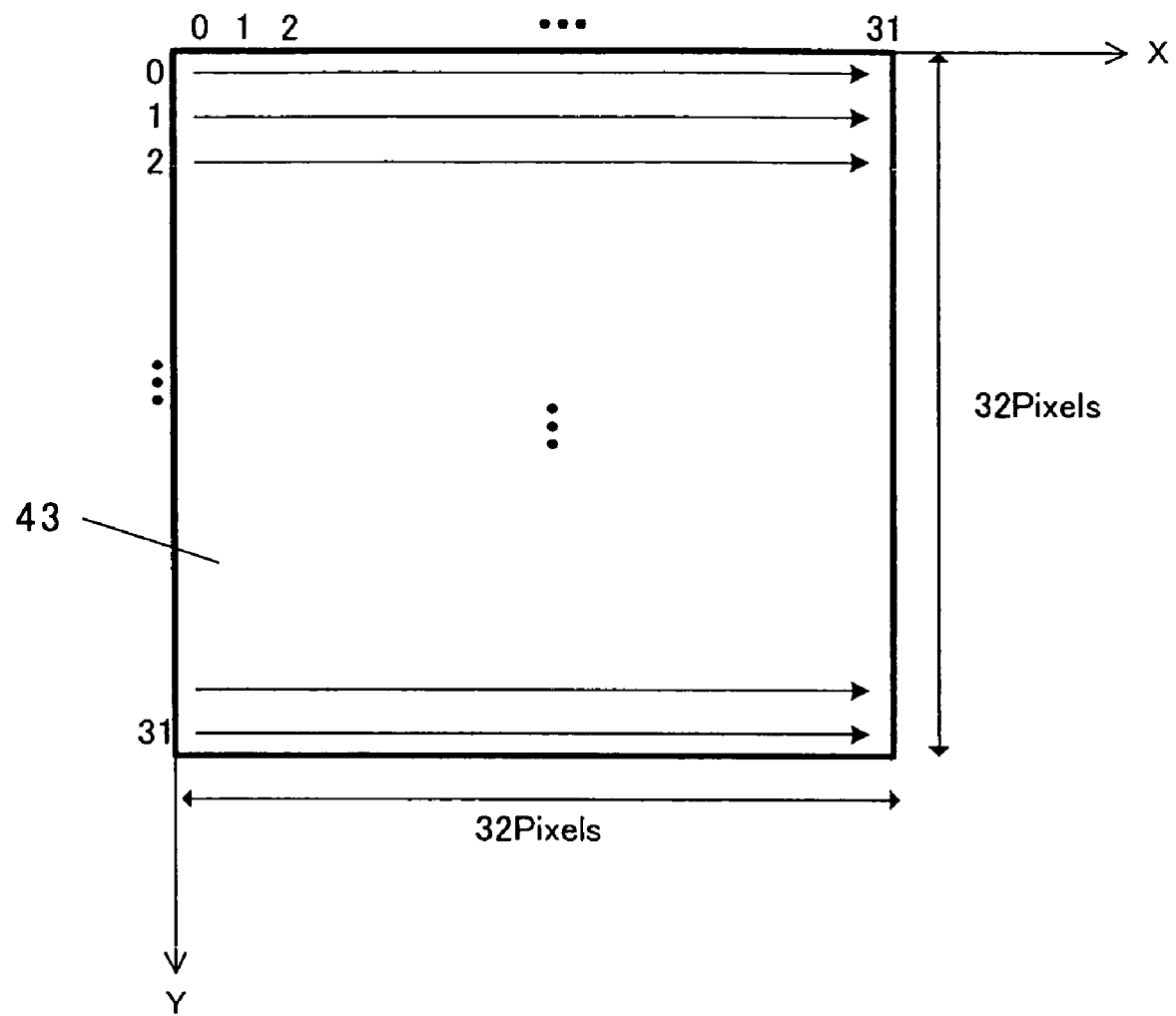
FIG. 16 is a view for explaining coordinate calculation of the target point of the operation article.

FIG. 16 is a view for explaining coordinate calculation of the target point of the operation article 150. The image sensor 43 of FIG. 16 consists of 32 pixels×32 pixels.

As illustrated in FIG. 16, the CPU 201 scans the differential data for 32 pixels in the direction of X-axis (horizontal direction), and then the CPU 201 increments the Y-coordinate. In this way, the CPU201 scans the differential data for 32×32 pixels while updating the Y-coordinate.

In this case, the CPU 201 searches the differential data having the maximum luminance value, and then compares the maximum luminance value to a predefined threshold value "Th". If the maximum luminance value is larger than the predefined threshold value "Th", the CPU 201 calculates the coordinate of the target point of the operation article 150 on the basis of the pixel having the maximum luminance value. This will be explained in detail.

Figure 17A:
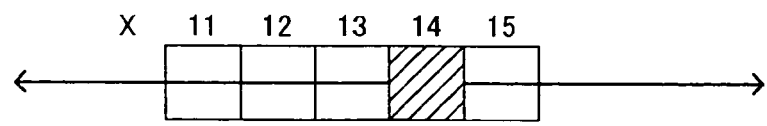
FIG. 17A is a view for explaining scanning process in X-axial direction when the CPU calculates the coordinate of the target point of the operation article on the basis of the pixel having the maximum luminance value.
Figure 17B:
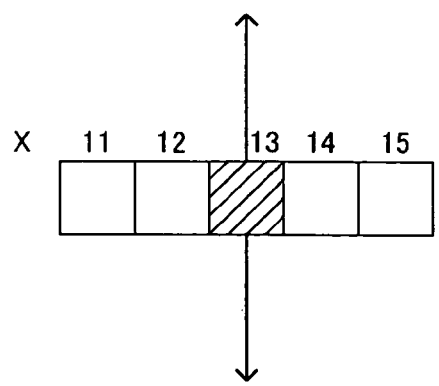
FIG. 17B is a view for explaining the beginning of the scanning process in Y-axial direction when the CPU calculates the coordinate of the target point of the operation article on the basis of the pixel having the maximum luminance value.
Figure 17C:
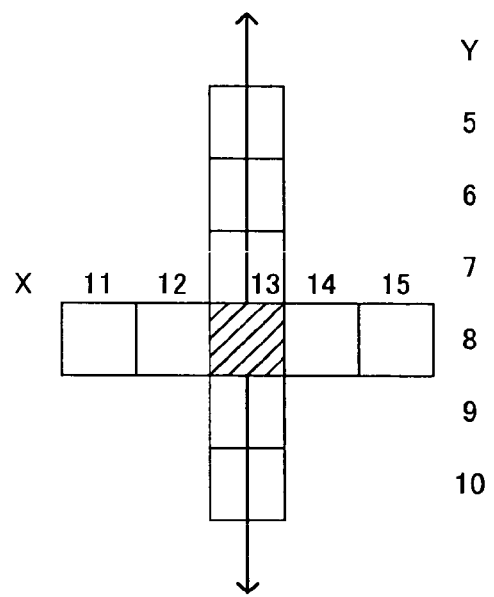
FIG. 17C is a view for explaining the scanning process in Y-axial direction when the CPU calculates the coordinate of the target point of the operation article on the basis of the pixel having the maximum luminance value.
Figure 17D:
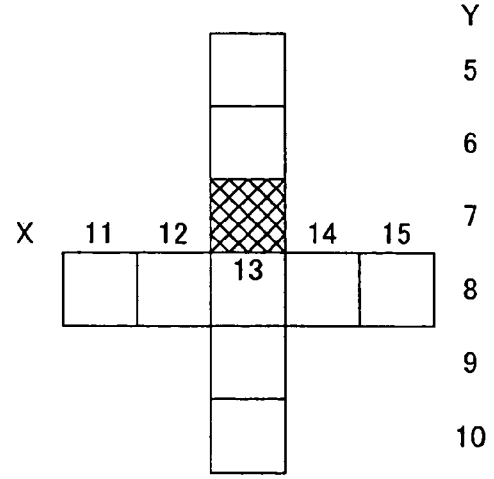
FIG. 17D is a view for explaining the result when the CPU calculates the coordinate of the target point of the operation article on the basis of the pixel having the maximum luminance value.

FIG. 17A is a view for explaining scanning process in X-axial direction when the CPU 201 calculates the coordinate of the target point of the operation article 150 on the basis of the pixel having the maximum luminance value. FIG. 17B is a view for explaining the beginning of the scanning process in Y-axial direction when the CPU 201 calculates the coordinate of the target point of the operation article 150 on the basis of the pixel having the maximum luminance value. FIG. 17C is a view for explaining the scanning process in Y-axial direction when the CPU 201 calculates the coordinate of the target point of the operation article 150 on the basis of the pixel having the maximum luminance value. FIG. 17D is a view for explaining the result when the CPU 201 calculates the coordinate of the target point of the operation article 150 on the basis of the pixel having the maximum luminance value.

As illustrated in FIG. 17A, the CPU 201 detects a pixel having a luminance value which is larger than the predetermined threshold value "Th" by scanning the differential data in X-axial direction on the basis of the pixel having the maximum luminance value. In this example of FIG. 17A, the pixels from X=11 to X=15 exceed the threshold value "Th".

Next, as illustrated in FIG. 17B, the CPU 201 derives a center pixel of the pixels from X=11 to 15. The X-coordinate of the center pixel is Xc=13.

Next, as illustrated in FIG. 17C, the CPU 201 detects a pixel having a luminance value which is larger than the predetermined threshold value "Th" by scanning the differential data in Y-axial direction on the basis of the X-coordinate(=13) derived in FIG. 17B. In this example of FIG. 17C, the pixels from Y=5 to Y=10 exceed the threshold value "Th".

Next, as illustrated in FIG. 17D, the CPU 201 derives a center pixel of the pixels from Y=5 to Y=10. The X-coordinate of the center pixel is Yc=7.

The CPU 201 assigns the coordinate Xc(=13) of the target point to PX[M], and the coordinate Yc(=7) to PY[M]. Then, the CPU 201 calculates a moving average (AX, AY) of the target point (Xc, Yc). In addition, the CPU 201 converts the moving average (AX, AY) of the target point on the image sensor 43 into a coordinate (xc, yc) on the screen 91. Then, the CPU 201 assigns the coordinate xc to an array Ax[M], and the coordinate yc to an array Ay[M]. The CPU 201 executes the aforesaid process to acquire the coordinate (Ax[M], Ay[M]) of the target point every time a video frame is updated. For example, an origin of coordinates on the screen 91 is a center of the screen 91.

The CPU 201, for example, calculates the moving average for (n+1) video frames using following formulas. "n" is a natural number (for example, "3").

$$AX=(PX[M]+PX[M-1]+\ldots+PX[M-n])/(n+1) \quad (1)$$

$$AY=(PY[M]+PY[M-1]+\ldots+PY[M-n])/(n+1) \quad (2)$$

$$AX=(PX[M]+PX[M-1]+\ldots+PX[M-n])/(n+1) \quad (1)$$

$$AY=(PY[M]+PY[M-1]+\ldots+PY[M-n])/(n+1) \quad (2)$$

Incidentally, "M" is a natural number in the formulas (1) and (2), and it is incremented every time a video frame is updated. The CPU 201 registers the average coordinate (Ax [M],Ay[M]) of the target point of the operation article 150 as a coordinate of the cursor 107 to be displayed on the next video frame (stores in the inner memory 207). In addition, the CPU 201 registers necessary information such as storage location information of pixel pattern data, color palette—information and depth information for generating an image of the cursor 107(stores in the inner memory 207). The pixel pattern data, the color palette information and the depth value are related to the sprite constructing the object (or the cursor 107). They are similar to the ones of the block "B" of FIG. 13.

[Color Change Process]

When the cursor 107 enters an area in which any one of color selective objects 101 to 103 is displayed, the CPU 201 registers color palette information associated with the color selective object which the cursor 107 enters (stores in the inner memory 207). The color palette information is used for the star image 108. The color palette information associated with any one of the color selective object 101 to 103 is registered as a default. The meaning of the color palette information is same as the above one.

[Size Change Process]

When the cursor 107 is brought to the area in which any one of the size selective object 104 to 106 is displayed, the CPU 201 registers an identification number of the size selective object which the cursor 107 is brought to (stores in the inner memory 207). Incidentally, any one of the identification number of the size selective object 104 to 106 is registered as a default.

FIG. 18 is a view showing a relation between the identification number of the size selective object 104 to 106 and the storage location information of the animation table. As illustrated in FIG. 18, the identification number ID0 to ID2 of the size selective object 104 to 106 and the storage location information "address0" to "address2" of the animation table are associated with each other. The storage location information of the animation table indicates start address information of an area storing the animation table.

The animation table indicated by the storage location information "address0" (corresponding to the size selective object 104) is used to animate the small star image 108. The animation table indicated by the storage location information "address1" (corresponding to the size selective object 105) is used to animate the middle size star image 108. The animation table indicated by the storage location information "address2" (corresponding to the size selective object 106) is used to animate the big star image 108.

FIG. 19 is a view showing an example of the animation table pointed by the storage location information of FIG. 18 to animate the star image 108. As illustrated in FIG. 19, the animation table is a table in which storage location information of animation image data, a segment number, duration information, next segment information and size information of the block "B" are associated with each other. Animation consists of a plurality of segment which are arranged in time series. Therefore, the animation image data consists of segment image data set. Each segment image data expresses different types of star image 108. The segment image data is a pixel pattern data. The segment number is a number assigned to each segment. The duration information indicates how many frames the same segment (or the same object) should be successively displayed. The next segment information designates the number of the segment which should be displayed next after the current object is displayed according to the duration information. For example, the next segment information "next" indicates that the segment of the number "2" must be displayed after displaying the segment of the number "1" during one frame (the duration information). In addition, for example, the next segment information "top" indicates that the segment of the initial number "1" must be displayed after displaying the segment of the number "4" during one frame (the duration information).

The block size information indicates a size of the block "B" (refer to FIG. 13) in which a segment (i.e. the star image 108) is displayed. In case of animation image data for the star image 108, a size of one segment and a size of one block "B" are same. Since the storage location information of the animation image data is storage location information of segment image data (i.e. the pixel pattern data) of the segment number "1", the storage location information of segment image data for from the segment number "2" to the last is calculated on the basis of the block size information.

[Screen Clear Process]

When the cursor 107 enters an area in which the clear button 113 is displayed, the CPU 201 turns the clear flag on.

The CPU 201 detects the block "B" (refer to FIG. 13) on which the drawing cursor 107 exists on the basis of the average coordinate (Ax[M],Ay[M]) of the target point of the operation article 150, in other words the display coordinate of the drawing cursor 107. Then, the CPU 201 relates the identification number registered in size change process with the detected block "B" (refer to FIG. 13), and registers the identification number related to the detected block "B". Therefore, the identification number is registered one by one every time the drawing cursor 107 moves.

In addition, the CPU 201 changes the storage location information of the pixel pattern data of the array PA corresponding to each block "B" existing on a motion path of the drawing cursor 107. In this case, the CPU 201 refers to the animation table stored in the area indicated by the storage location information (refer to FIG. 18) associated with the identification number registered for each block "B" existing on the motion path of the drawing cursor 107.

As explained above, the CPU 201 derives the storage location information of the segment image data (i.e. the pixel pattern data) for from segment number "2" to the last on the basis of the storage location information of the segment image data (i.e. the pixel pattern data) and the block size information for segment number "1".

As has been discussed above, with reference to the animation table, the twinkling star image 108 is displayed by changing data of the array PA every time the video frame is updated.

In addition, the CPU 201 changes the color palette information of the array CA corresponding to the block "B" in which the drawing cursor 107 currently exists to the one registered in color change process. The color palette information for the array CA corresponding to the blocks "B" where the drawing cursor 107 existed previously is maintained.

In addition, when the clear flag in on, the CPU 201 assigns the storage location information of the pixel pattern data for the drawing screen 120 to the array PA, and the color palette information and the depth value for the drawing screen 120 to the array CA. In this way, all star images 108 are deleted.

The storage location information of the pixel pattern data for the drawing screen 120 is assigned to the array PA as a default, and the color palette information and the depth value for the drawing screen 120 are assigned to the array CA.

[Image Display Process]

The CPU 201 sends necessary information for generating image to the graphic processor 202 of FIG. 7 during a vertical blanking period. Then, the graphic processor 202 generates the video signal in accordance with the information sent from the CPU 201, and outputs the video signal to the video signal output terminal 47. In this way, the drawing screen 120, the color selective objects 101 to 103, the size selective objects 104 to 106, the clear button 113 and the cursor 107 are displayed on the screen 91 of the television monitor 90. This will be explained in detail.

The CPU 201 calculates a display coordinate of each sprite constructing the cursor 107 in accordance with the coordinate information (the average coordinate of the target point of the operation article 150) registered by the cursor control process. Then, the CPU 201 sends information of each sprite constructing the cursor 107 including the display coordinate information, the color palette information, the depth value, the size information, and the storage location information of the pixel pattern data to the graphic processor 202.

In addition, the CPU 201 sends information of each sprite constructing the color selective objects 101 to 103, the size selective objects 104 to 106 and clear button 113 including the display coordinate information, the color palette information, the depth value, the size information, and the storage location information of the pixel pattern data to the graphic processor 202.

Furthermore, the CPU 201 sends start addresses of the array PA[0] to PA[1023] and start addresses of the array CA[0] to CA [1023] to the graphic processor 202. The graphic processor 202 reads information stored in the array PA[0] to PA[1023] according to the sent start address, and then according to the read information, the graphic processor 202 reads pixel pattern data for displaying each of the block[0] to block [1023]. In addition, the graphic processor 202 reads information stored in the array CA[0] to CA[1023] according to the sent start address. The graphic processor 202 generates the video signal to display the cursor 107, the drawing screen 120, the star 108, the color selective objects 101 to 103, the size selective objects 104 to 106 and the clear button 113 on the basis of the information sent from the CPU 201 and the read information, and outputs it to the video signal output terminal 47.

[Audio Playback]

The audio playback is performed by interrupt processing. The CPU 201 reads and interprets commands from the musical score data 305 while incrementing a musical data pointer. The musical data pointer indicates a location to start reading information contained in the musical score data 305.

Then, when the command is note on, the CPU 201 sends a start address storing the wave data 306 corresponding to a pitch (the frequency of sound vibration) designated by a note number and an musical instrument (tone quality) designated by instrument designation information contained in the musical score data 305 to the sound processor 203. In addition, when the command is note on, the CPU 201 sends a start address storing necessary envelope data to the sound processor 203. Furthermore, when the command is note on, the CPU 201 sends pitch control information corresponding to the pitch designated by the note number and volume information contained in the musical score data 305 to the sound processor 306.

In what follows, the pitch control information will be explained. The pitch control information is used for pitch controlling performed by changing a cycle of reading the wave data 306 (the sound source data). More specifically, the sound processor 203 periodically reads the pitch control information at certain interval, and accumulates the information. The sound processor 203 processes the result of the accumulation, and makes use of the result of the processing as an address pointer for the wave data 306. Accordingly, if a large value is set to the pitch control information, the address pointer is quickly incremented to increase the frequency of the wave data 306. Conversely, if a small value is set to the pitch control information, the address pointer is slowly incremented to decrease the frequency of the waveform data 306. In this way, the sound processor 203 performs the pitch control of wave data 306.

The sound processor 203 reads from the ROM 51 the wave data 306, which is stored in the area pointed by the provided start address while incrementing the address pointer on the basis of the pitch control information. Then, the sound processor 203 generates an audio signal by multiplying the wave data 306, as sequentially read, by the envelope data and the volume information item. In this way, the audio signal indicative of the tone quality of the musical instrument, the pitch and the sound volume designated by the musical score data 305 is produced and output to the audio signal output terminal 49 by the sound processor 203.

On the other hand, the CPU 201 manages a gate time contained in the musical score data 305 as read. Accordingly, when a gate time elapses, the CPU 201 instructs the sound processor 203 to stop outputting the sound corresponding to the gate time. In response to this, the sound processor 203 terminates the sound output as instructed.

As has been discussed above, music is produced on the basis of the musical score data 305, and output from the speaker (not shown) of the television monitor 90.

Next, an example of the process flow of the drawing apparatus 1 will be explained with reference to several flow charts.

Figure 20:
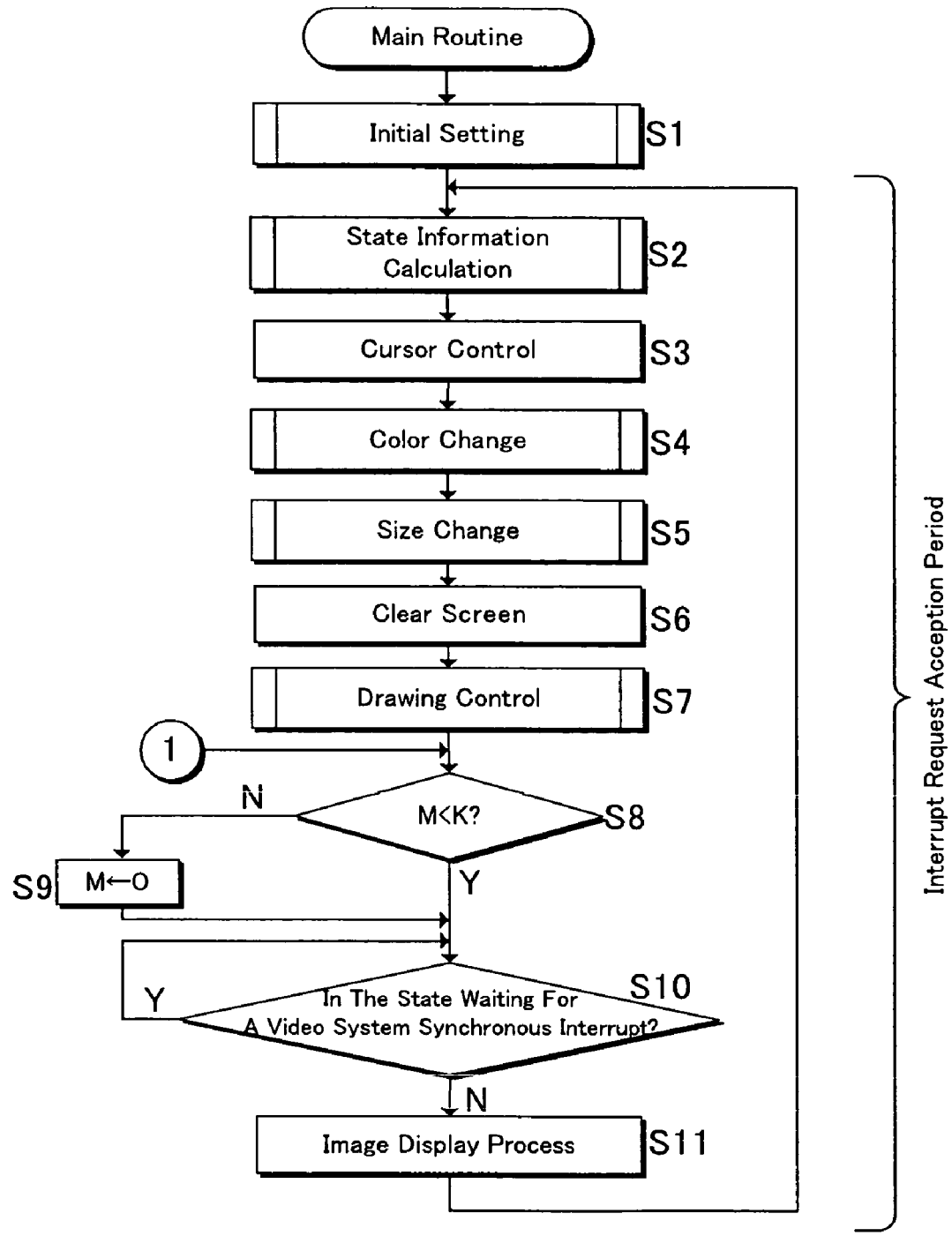
FIG. 20 is a flowchart showing the overall process flow of the drawing apparatus of FIG. 1.

FIG. 20 is a flowchart showing the overall process flow of the drawing apparatus 1 of FIG. 1. As illustrated in FIG. 20, the CPU 201 initializes a system in step S1.

In step S2, the CPU 201 calculates the average coordinate of the target point of the operation article 150 (state information calculation process). In step S3, the CPU 201 registers the average coordinate of the target point of the operation article 150 as the display coordinate of the cursor 107 (cursor control process).

In step S4, the CPU 201 registers the color palette information for changing the color of the star image 108 in accordance with the display coordinate of the cursor 107 (color change process). In step S5, the CPU 201 registers the identification number for changing the size of the star image 108 in accordance with the display coordinate of the cursor 107 (size change process). In step S6, the CPU 201 turns the clear flag on when the cursor 107 enters into the area containing the clear button 113 (screen clear process).

In step S7 (drawing control process), the CPU 201 rewrites the storage location information of the pixel pattern data of the array PA corresponding to the block "B" existing on the motion path of the drawing cursor 107. In addition, the CPU 201 changes the color palette information of the array CA corresponding to the block "B" where the drawing cursor 107 currently exists. However, when the clear flag is on in step S6, the CPU 201 changes all array PA and array CA to the data for the drawing screen.

In step S8, the CPU 201 determines whether or not "M" is smaller than a predetermined value "K". If "M" is equal to or more than the predetermined value "K", the CPU 201 proceeds to step S9, and assigns "0" to "M", and then proceeds to step S10. On the other hand, if the variable "M" is smaller than the predetermined value "K", the CPU 201 proceeds from step S8 to step S10.

In step S10, the CPU 201 determines whether or not the CPU 201 waits for the video system synchronous interrupt. The CPU 201 supplies the graphics processor 202 with the image information for refreshing the display screen of the television monitor 90 after the vertical blanking period starts. Accordingly, after completing the arithmetic operations for refreshing the display screen, the CPU 201 refrains from proceeding its operation until the next video system synchronous interrupt is issued. Namely, while it is "YES" in step S10, in other words, while the CPU 201 waits for the video system synchronous interrupt (i.e., there is no interrupt signal responsive to the video system synchronous signal), the process repeats the same step S10. On the other hand, if it is "NO" in step S10, in other words, if the CPU 201 gets out of the state of waiting for the video system synchronous interrupt (i.e., the CPU 201 is given the video system synchronous interrupt), the process proceeds to step S11.

In step S11, the CPU 201 sends necessary image information to generate the video signal (refer to FIG. 11) to the graphics processor 202 on the basis of the results of step S3 to S7 (the image displaying process). Then, the CPU 201 proceeds to step S2.

Figure 21:
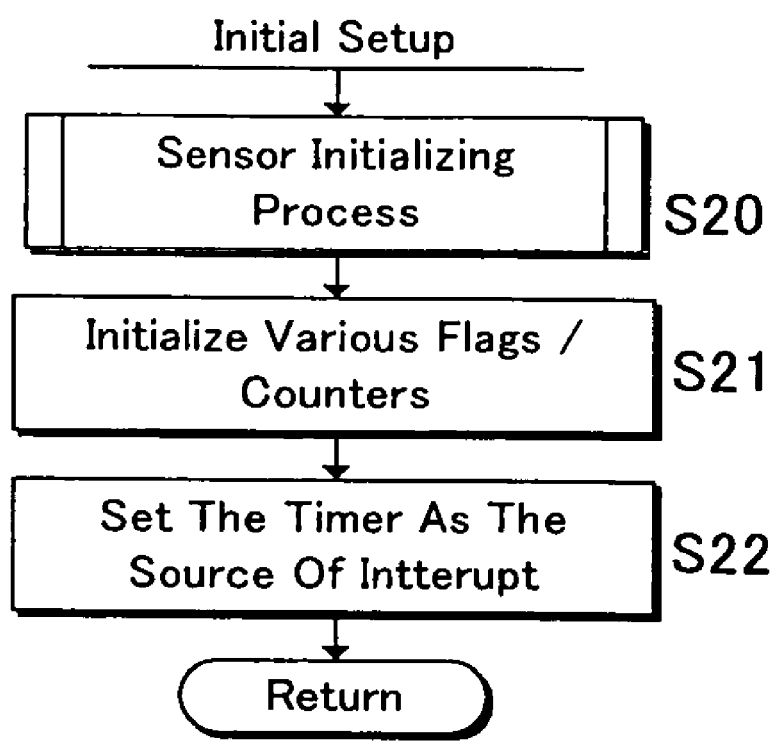
FIG. 21 is a flowchart showing the process flow of the initial setting process of step S1 of FIG. 20.

FIG. 21 is a flowchart showing the process flow of the initial setting process of step S1 of FIG. 20. As illustrated in FIG. 21, the CPU 201 initializes the image sensor 43. In step S21, the CPU 201 initializes various flags and counters. In step S22, the CPU 201 sets the timer circuit 210 as a source of generating an interrupt request signal for generating sound. By this interrupting process, the sound processor 203 performs processing, and sound is output from the speakers of the television monitor 90.

Figure 22:
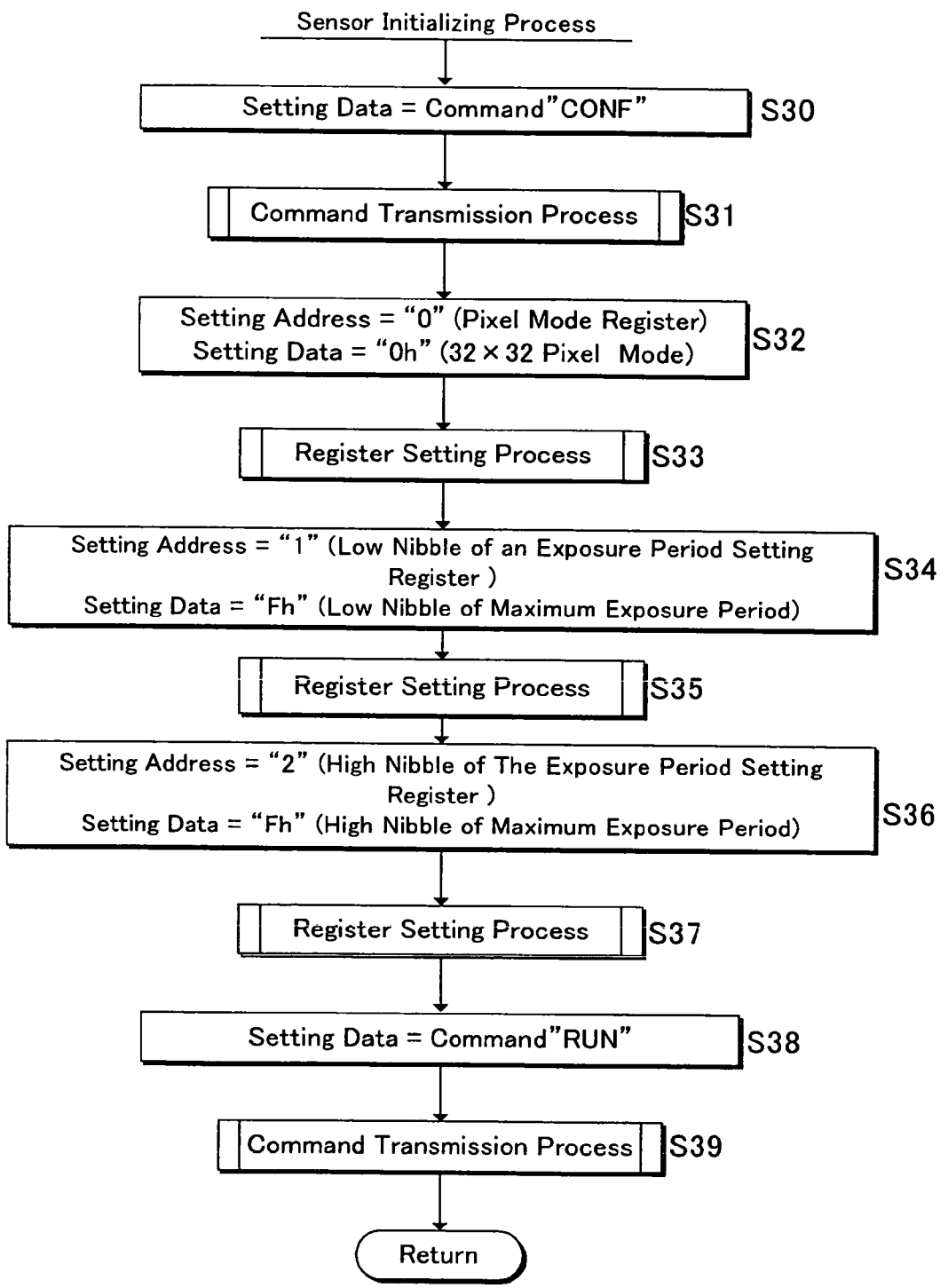
FIG. 22 is a flowchart showing the process flow of the sensor initialization of step S20 of FIG. 21.

FIG. 22 is a flowchart showing the process flow of the sensor initialization of step S20 of FIG. 21. As illustrated in FIG. 22, in step S30, the high speed processor 200 sets a command "CONF" as a setting data. This command "CONF" is a command which instructs the image sensor 43 to enter setting mode to send a command from the high speed processor 200. In step S31, the high speed processor 200 performs the command transmitting process.

Figure 23:
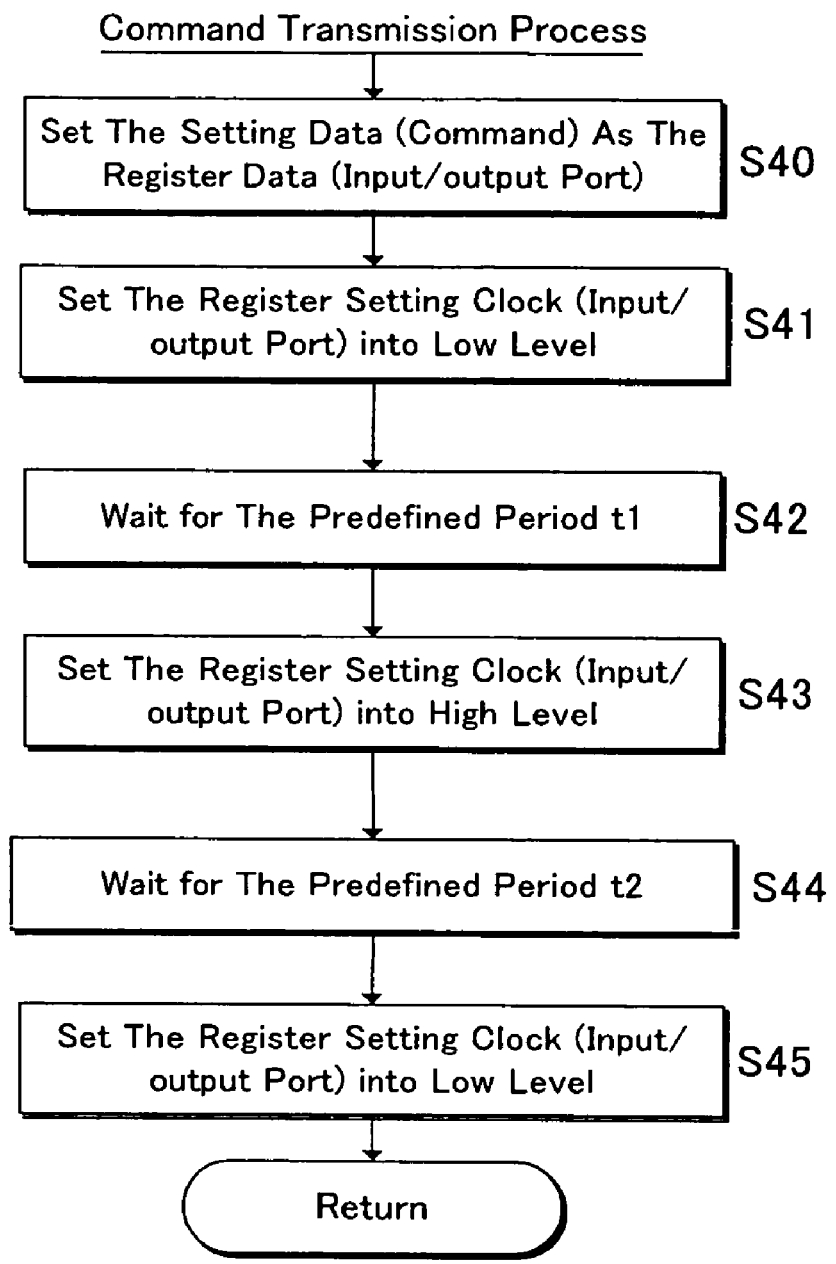
FIG. 23 is a flowchart showing the process flow of the command transmitting process of step S31 of FIG. 22.

FIG. 23 is a flowchart showing the process flow of the command transmitting process of step S31 of FIG. 22. As illustrated in FIG. 23, in step S40, the high speed processor 200 sets setting data (in case of step S31, the command "CONF") as register data (I/O port). In step S41, the high speed processor 200 sets register setting clock CLK (I/O port) to low level. After waiting for a predetermined period "t1" in step S42, in the next step S43, the high speed processor 200 sets the register setting clock CLK to high level. Then, after waiting for a predetermined period "t2" in step S44, in the next step S45, the high speed processor 200 sets the register setting clock CLK to low level.

Figures 24A, 24B:
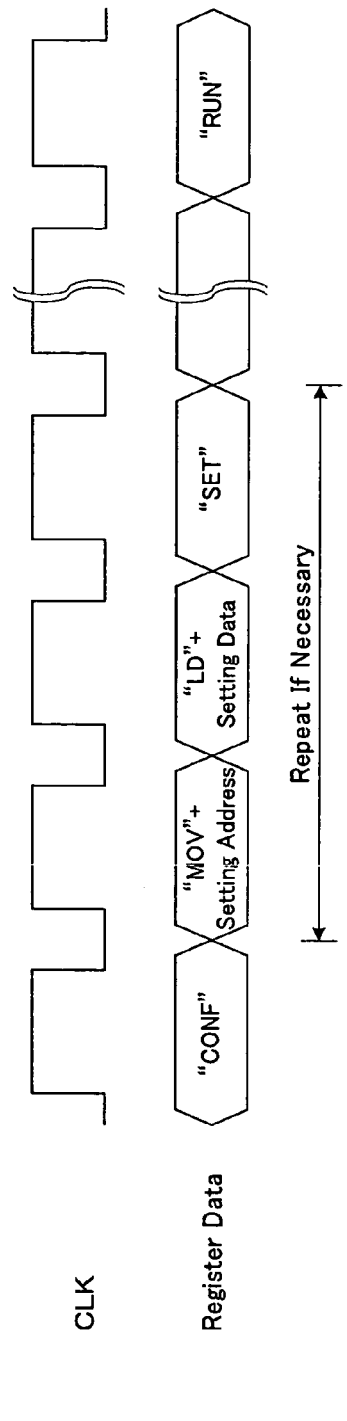
FIG. 24A is a timing chart of the register setting clock "CLK" of FIG. 8.
FIG. 24B is a timing chart of the register Data of FIG. 8.

In this way, as illustrated in FIG. 24A and FIG. 24B, the high speed processor 200 performs the command (command or command+data) transmitting process by periodically changing the register setting clock CLK into low level, high level, and low level while waiting for the predetermined periods "t1" and "t2".

Returning to FIG. 22, in step S32, the high speed processor 200 sets a pixel mode and also sets an exposure period. In this embodiment, since the image sensor 43 is the CMOS image sensor which consists of 32 pixels×32 pixels as mentioned above, the high speed processor 200 sets "0h" which indicates it consists of 32 pixels×32 pixels, to a pixel mode register whose setting address is "0". In step S33, the high speed processor 200 performs a register setting process.

Figure 25:
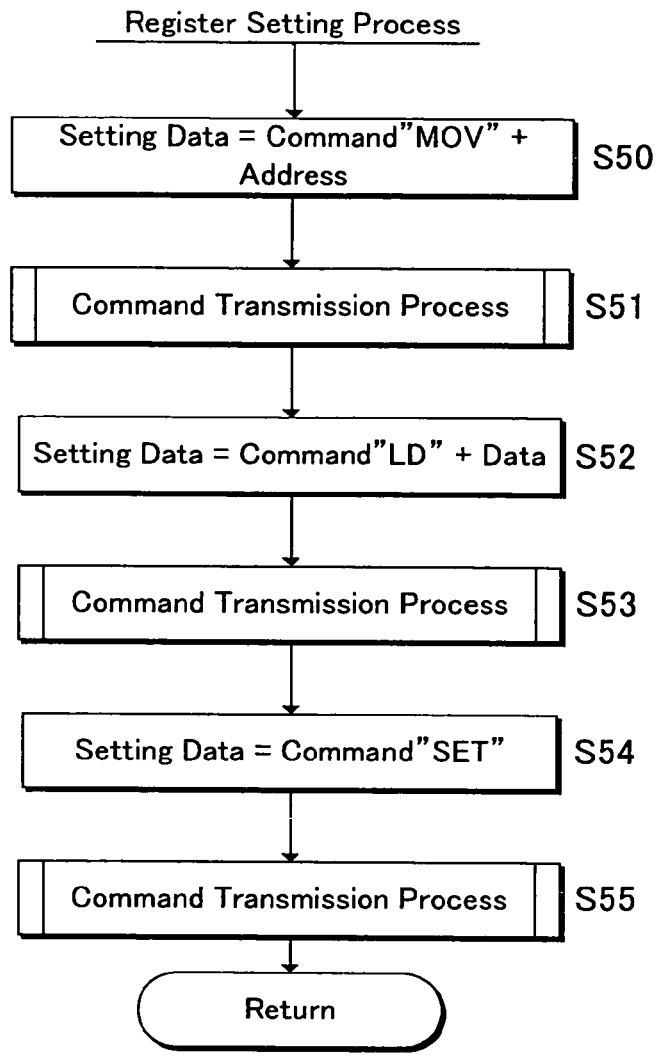
FIG. 25 is a flowchart showing the process flow of the register setting process of step S33 of FIG. 22.

FIG. 25 is a flowchart showing the process flow of the register setting process of step S33 of FIG. 22. As illustrated in FIG. 25, in the first step S50, the high speed processor 200 sets a command "MOV" +"address" as a setting data. Then, in step S51, the high speed processor 200 transmits the command to the image sensor 43 by executing the command transmitting process as explained hereinbefore (refer to FIG. 23). In step S52, the high speed processor 200 sets a command "LD" +"data" as a setting data. Then, in step S53, the high speed processor 200 transmits the command to the image sensor 43 by executing the command transmitting process as explained hereinbefore (refer to FIG. 23). Then, in step S54, the high speed processor 200 sets a command "SET" as a setting data. Then, in step S55, the high speed processor 200 transmits the command to the image sensor 43 by executing the command transmitting process as explained hereinbefore (refer to FIG. 23). The command "MOV" indicates to transmit an address of the control register. The command "LD" indicates to transmit data. The command "SET" indicates to set data to the address. Incidentally, if there are several control registers to set, the register setting process is repeatedly executed.

Returning to FIG. 22, in step S34, the high speed processor 200 sets "1" (indicating an address of low nibble of an exposure period setting register) as a setting address, and also sets low nibble data "Fh" of "FFh" indicating the maximum exposure period. Then, in step S35, the high speed processor 200 executes the register setting process of FIG. 25. In a similar way, in step S36, the high speed processor 200 sets "2" (indicating an address of high nibble of the exposure period setting register) as a setting address, and also sets high nibble data "Fh" of "FFh" indicating the maximum exposure period. Then, in step S37, the CPU 201 executes the register setting process of FIG. 25.

In step S38, the high speed processor 200 sets a command "RUN" which indicates an end of setting and also makes the image sensor 43 start outputting data. Then, in step S39, the high speed processor 200 transmits it. In this way, the sensor initializing process of step S20 of FIG. 21 is performed. However, the example from FIG. 22 to FIG. 25 may be changed depending on the specification of the image sensor 43.

Figure 26:
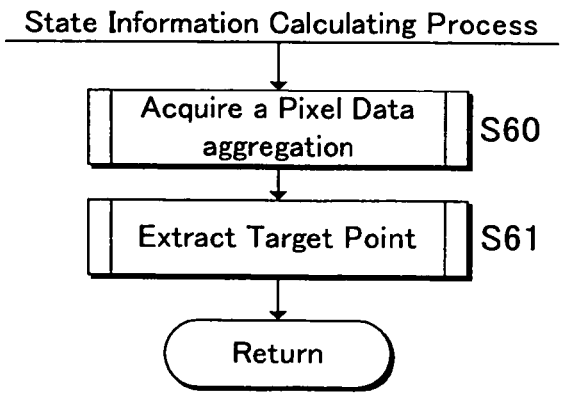
FIG. 26 is a flowchart showing the process flow of the state information calculating process of step S2 of FIG. 20.

FIG. 26 is a flowchart showing the process flow of the state information calculating process of step S2 of FIG. 20. As illustrated in FIG. 26, in step S60, the CPU 201 obtains the digital pixel data from ADC 208. This digital pixel data is obtained by converting the analog pixel data as output from the image sensor 43.

In step S61, the target point extracting process is executed. More specifically, the CPU 201 obtains the differential data between the pixel data with and without light emitted from the infrared-emitting diodes 15. The CPU 201 compares the differential data with the predetermined threshold value "Th"

and then counts pixels having the differential data exceeding the predetermined threshold value. At the same time, the CPU 201 derives a maximum value of the differential data exceeding the predetermined threshold value "Th". Then, the CPU 201 calculates a coordinate of pixel having the maximum value of the differential data. Furthermore, the CPU 201 calculates the moving average of thus calculated coordinates. Then, the CPU 201 converts it to the coordinate on the screen 91 of the television monitor 90, and makes use of it as the coordinate (Ax[M],Ay[M]) of the target point of the operation article 150, in other words, the display coordinate of the cursor 107.

Figure 27:
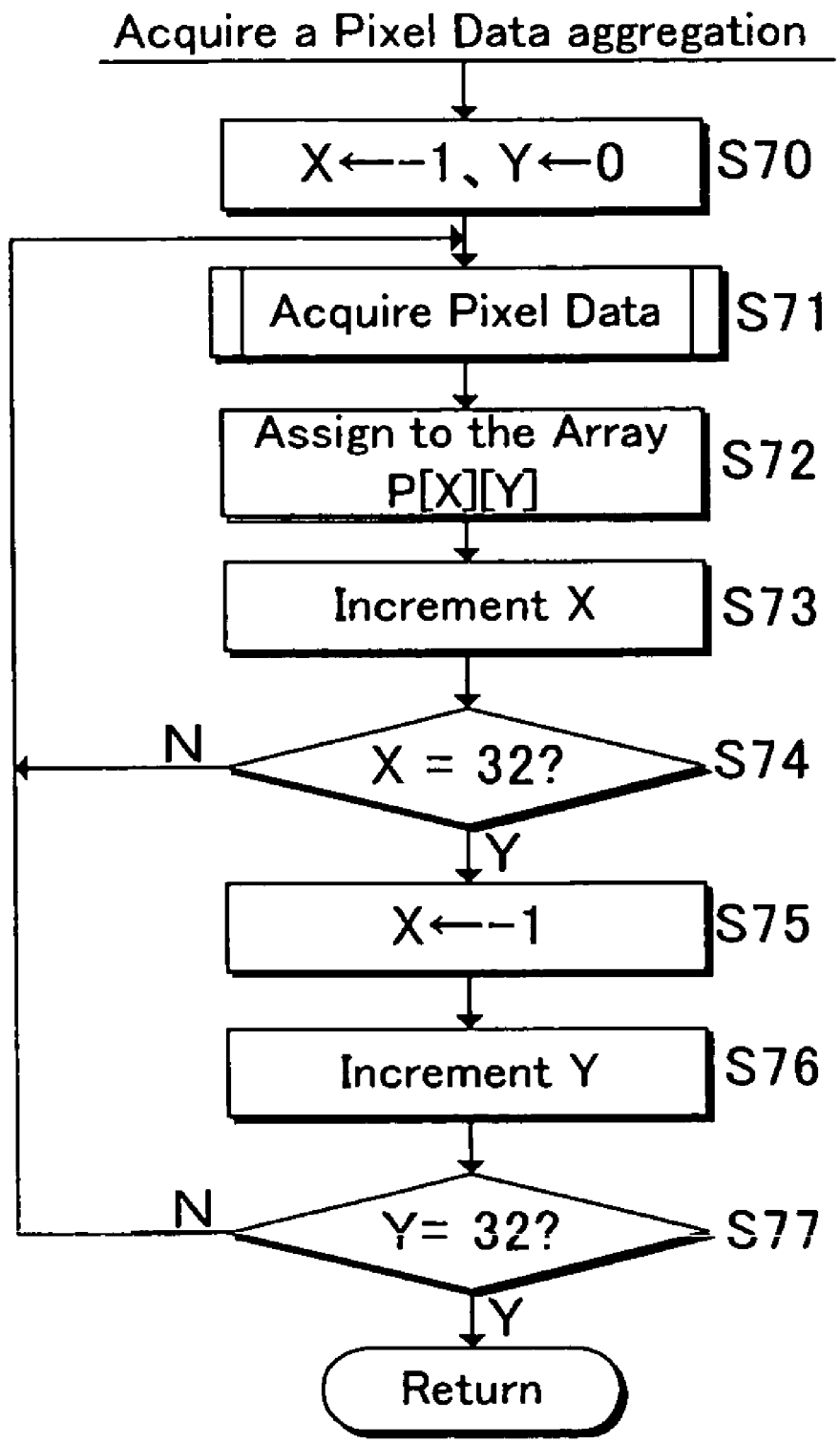
FIG. 27 is a flowchart showing the process flow of the pixel data aggregation acquiring process of step S60 of FIG. 26.

FIG. 27 is a flowchart showing the process flow of the pixel data aggregation acquiring process of step S60 of FIG. 26. As illustrated in FIG. 27, in the first step S70, the CPU 201 sets "–1" to "X" and "0" to "Y" as an element number of a pixel data array. In this embodiment, the pixel data array is a two-dimensional array such as X=0 to 31 and Y=0 to 31. However, since dummy data is output as first pixel data of each row as explained before, "–1" is set as an initial value of "X". In the following step S71, the CPU 201 executes a pixel data acquiring process.

Figure 28:
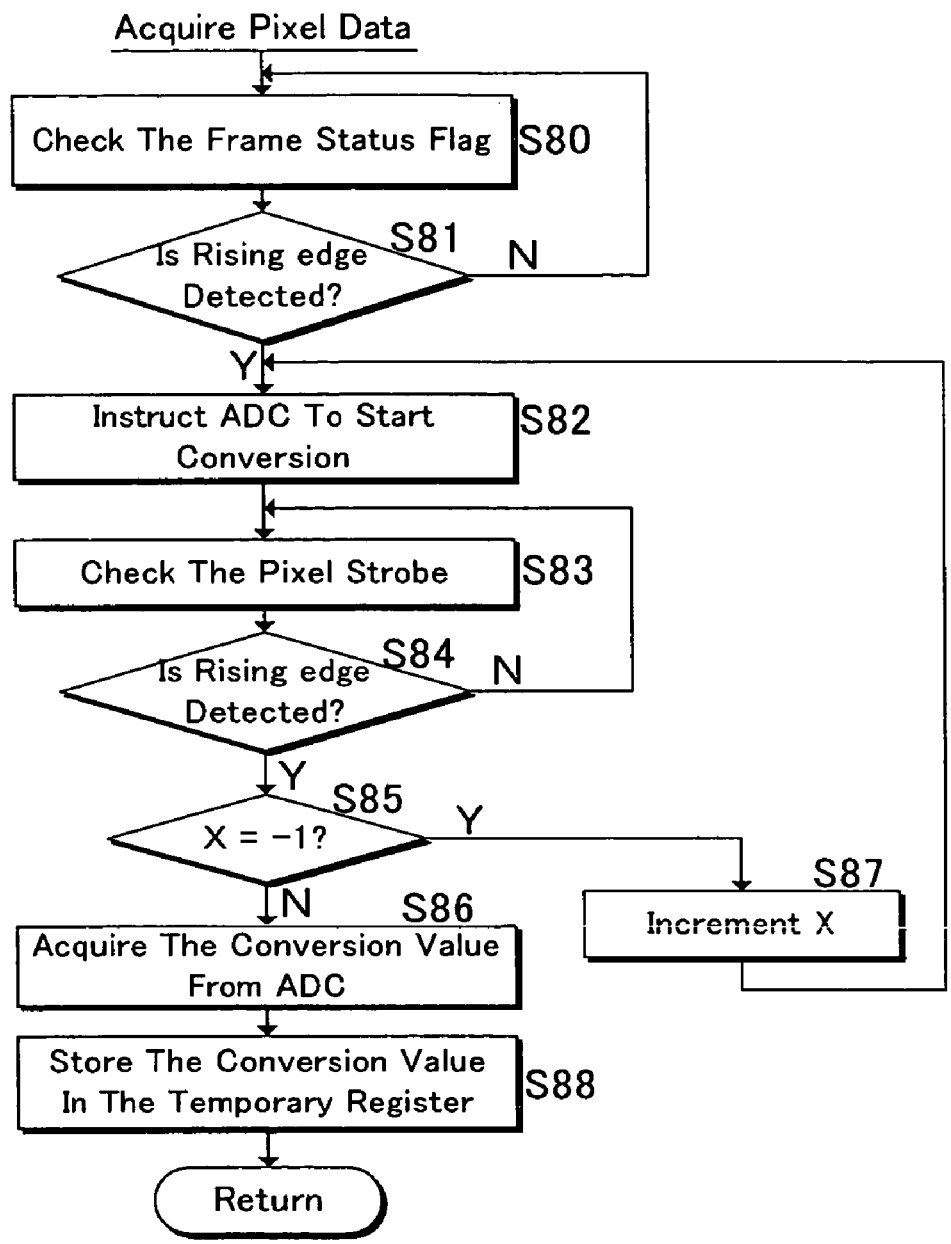
FIG. 28 is a flowchart showing the process flow of the pixel data acquiring process of step S71 of FIG. 27.

FIG. 28 is a flowchart showing the process flow of the pixel data acquiring process of step S71 of FIG. 27. As illustrated in FIG. 28, in the first step S80, the CPU 201 checks the frame status flag signal FSF as transmitted from the image sensor 43. Then, when CPU 201 detects the rising edge of the frame status flag signal FSF, the process proceeds to step S82, otherwise proceeds to step S80 (step S81). In step S82, the CPU 201 instructs the ADC 208 to start converting the analog pixel data into the digital data. After that, in step S83, the CPU 201 checks the pixel strobe PDS as transmitted from the image sensor 43. Then, when CPU 201 detects the rising edge of the pixel strobe PDS, the process proceeds to step S85, otherwise proceeds to step S83 (step S84).

In step S85, the CPU 201 determines whether or not X=–1, in other words, "X" is the first pixel. As explained before, since the first pixel of each row is set as the dummy pixel, if the CPU 201 determines "YES" in step S85, in the next step S87, the CPU 201 does not acquire the pixel data at the time but increments the element number "X".

If the CPU 201 determines "NO" in step S85, since the pixel data is pixel data from the second one in the row, in step S86 and S88, the CPU 201 acquires the pixel data at the time and stores it in temporary register (not shown). After that, the CPU 201 proceeds to step S72 of FIG. 27.

In step S72 of FIG. 27, the CPU 201 assigns the pixel data stored in the temporary register to the pixel data array P[X][Y].

In step S73, the CPU 201 increments "X". If X is smaller than "32", the process from step S71 to step S73 is repeatedly executed. If X=32, in other words, the acquisition of pixel data reaches the end of the row, the CPU 201 sets "–1" to "X" in step S75, and then increments "Y" in step S76. Then, CPU 201 repeats the pixel data acquiring process from the head of the next row.

In step S77, if Y=32, in other words, the acquisition of pixel data reaches the end of the pixel data array P[X][Y], the CPU 201 proceeds to step S61 of FIG. 26.

Figure 29:
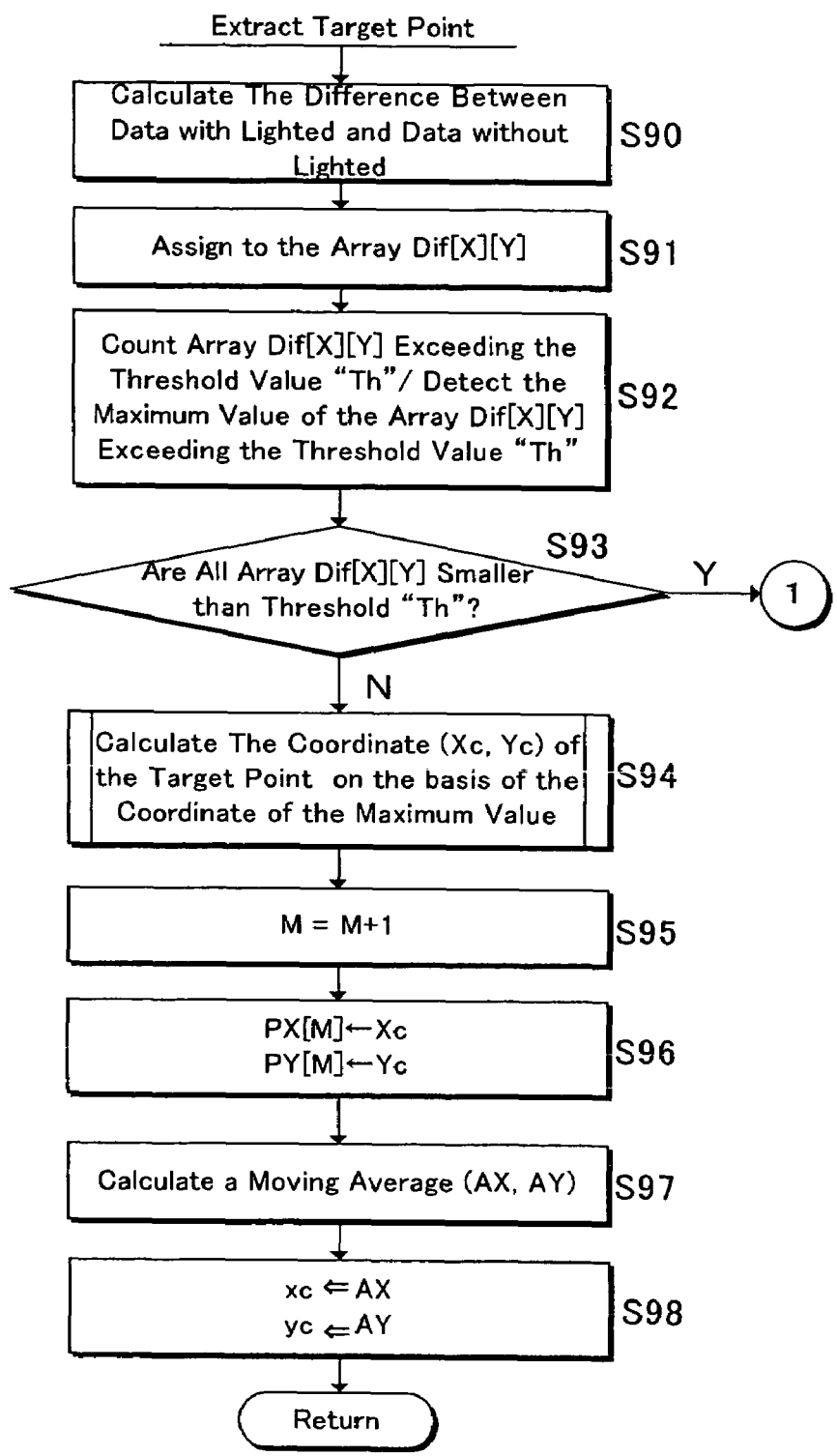
FIG. 29 is a flowchart showing the process flow of the target point extracting process of step S61 of FIG. 26.

FIG. 29 is a flowchart showing the process flow of the target point extracting process of step S61 of FIG. 26. As illustrated in FIG. 29, in step S90, the CPU 201 calculates the difference between the pixel data with and without light emitted from the infrared-emitting diodes 15 to obtain differential data. In step S91, the CPU 201 assigns the differential data to the array Dif[X][Y]. In this embodiment, since the 32 pixel× 32 pixel image sensor 43 is used, X=0 to 31 and Y=0 to 31.

In step S92, the CPU 201 scans all elements of the array Dif[X][Y], and then counts a number of the elements exceeding the threshold value "Th". Then, when the count value does not exceed a predetermined value "k", the CPU 201 turns a pen-up flag on. On the other hand, when the count value exceeds the predetermined value "k", the CPU 201 turns the pen-up flag off. The count value corresponds to an area of the operation article 150 on the screen 91. The area becomes larger when the operation article 150 is closer to the image sensor 43, and smaller when the operation is farther to the image sensor 43. Because of this, if the count value is larger, the operation article 150 is closer to the image sensor 43, and if smaller, the operation article 150 is farther to the image sensor 43. Therefore, when the count value does not exceed the predetermined value "k", it means the operation article 150 is more than a certain distance away from the image sensor 43. In this case, the CPU 201 turns the pen-up flag on. It is possible to set an arbitrary value to the predetermined value "k".

The CPU 201 detects the maximum value from elements exceeding the threshold value "Th" while scanning all elements of the array Dif[X][Y].

If the all elements of the array Dif[X][Y] do not exceed the predetermined threshold value "Th", the CPU 201 proceeds to step S8 of FIG. 20, otherwise proceeds to step S94 (step S93).

In step S94, the CPU 201 calculates the coordinate (Xc,Yc) of the target point of the operation article 150 on the basis of the coordinate of the pixel having the maximum value. In step S95, the CPU 201 increments a value of the variable "M" by one (M=M+1)

In step S96, the CPU 201 assigns the coordinates Xc and Yc to the array PX[M] and PY[M]. Then, in step S97, the CPU 201 calculates the moving average (AX[M],AY[M]) of the target point (Xc,Yc) of the operation article 150. In step S98, the CPU 201 converts the average coordinate (AX[M],AY[M]) of the target point on the image sensor 43 into the coordinate (xc,yc) on the screen 91 of the television monitor 90.

Figure 30:
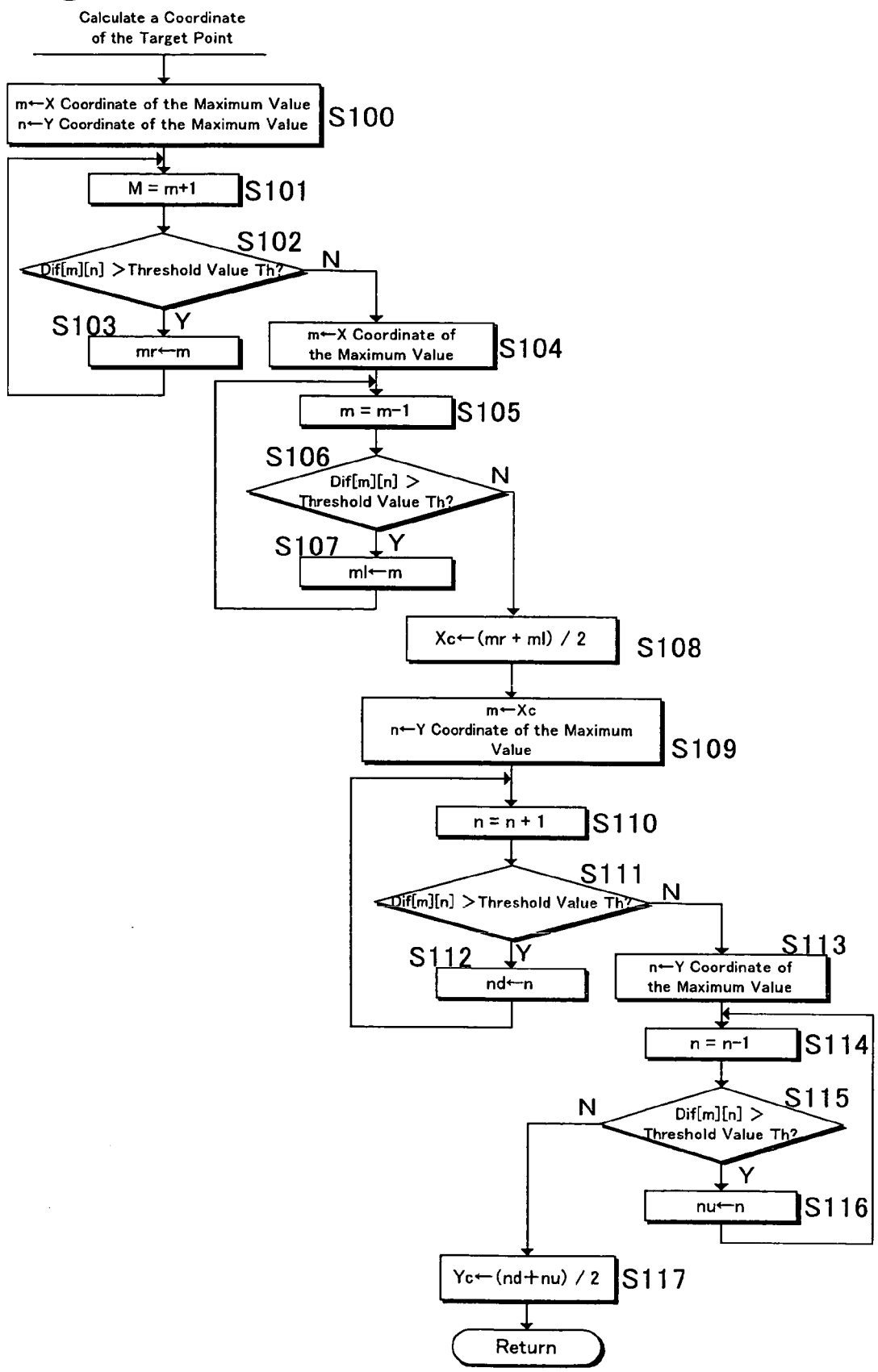
FIG. 30 is a flowchart showing the process flow of the target point coordinate calculating process of step S94 of FIG. 29.

FIG. 30 is a flowchart showing the process flow of the target point coordinate calculating process of step S94 of FIG. 29. As illustrated in FIG. 30, in step S100, the CPU 201 assigns the X coordinate and Y coordinate of the maximum value calculated in step S92 to "m" and "n". In step S101, the CPU 201 increments "m" by one (m=m+1).

If the differential data Dif[m][n] is larger than the predetermined threshold value "Th", the CPU 201 proceeds to step S103, otherwise proceeds to step S104 (step S102). In step S103, the CPU 201 assigns "m" at the time to "mr". In this way, the CPU 201 scans from the coordinate of the pixel having the maximum value in positive direction of X-axis while repeatedly executing the process from step S101 to S103 and obtains the X-coordinate of the endmost differential data exceeding the threshold value "Th".

In step S104, the CPU 201 assigns the X-coordinate of the maximum value calculated in step S92 to "m". In step S105, the CPU 201 decrements "m" by one.

If the differential data Dif[m][n] is larger than the predetermined threshold value "Th", the CPU 201 proceeds to step S107, otherwise the CPU 201 proceeds to step S108 (step S106). In step S107, the CPU 201 assigns "m" at the time to "ml". In this way, the CPU 201 scans from the coordinate of the pixel having the maximum value in negative direction of X-axis while repeatedly executing the process from step S105 to S107 and obtains an X-coordinate of the endmost differential data exceeding the threshold value "Th".

In step S108, the CPU 201 calculates the center coordinate between X-coordinate "mr" and X-coordinate "ml", and makes use of it as the X-coordinate (Xc) of the target point. In step S109, the CPU 201 assigns the "Xc" calculated in step S108 and the Y-coordinate of the pixel having the maximum value calculated in step S92 to "m" and "n". In step S110, the CPU 201 increments "n" by one (n=n+1). If the differential data Dif[m] [n] is larger than the predetermined threshold value "Th", the CPU 201 proceeds to step S112, otherwise proceeds to step S113 (step S111). In step S112, the CPU 201 assigns "n" at the time to "nd". In this way, the CPU 201 scans from the coordinate of the pixel having the maximum value in positive direction of Y-axis while repeatedly executing the process from step S110 to S112 and obtains the Y-coordinate of the endmost differential data exceeding the threshold value "Th".

In step S113, the CPU 201 assigns the Y-coordinate of the pixel having the maximum value calculated in step S92 to "n". In step S114, the CPU 201 decrements "n" by one. If the differential data Dif[m] [n] is larger than the predetermined threshold value "Th", the CPU 201 proceeds to step S116, otherwise proceeds to step S117 (step S115). In step S116, the CPU 201 assigns "n" at the time to "nu". In this way, the CPU 201 scans from the coordinate of the pixel having the maximum value in negative direction of Y-axis while repeatedly executing the process from step S114 to S116 and obtains the Y-coordinate of the endmost differential data exceeding the threshold value "Th".

In step S117, the CPU 201 calculates a center coordinate between the Y-coordinate "nd" and the Y-coordinate "nu", and makes use of it as the Y-coordinate (Yc) of the target point. In this way, the coordinate (Xc,Yc) of the target point of the operation article 150 is calculated.

Figure 31:
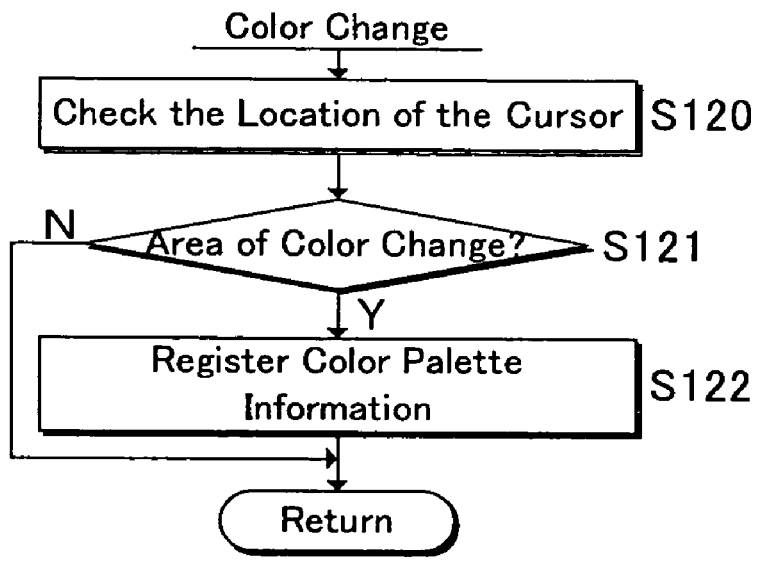
FIG. 31 is a flowchart showing the process flow of the color change process of step S4 of FIG. 20.

FIG. 31 is a flowchart showing the process flow of the color change process of step S4 of FIG. 20. As illustrated in FIG. 31, the CPU 201 checks a location of the cursor 107 (the target point of the operation article 150) in step S120. When the cursor 107 exists in the area in which any one of the color selective objects 101 to 103 is displayed, the CPU 201 proceeds to step S122, otherwise proceeds to step S5 of FIG. 20 (step S121).

In step S122, the CPU 201 registers color palette information associated with the color selective object in which the cursor 107 exists.

Figure 32:
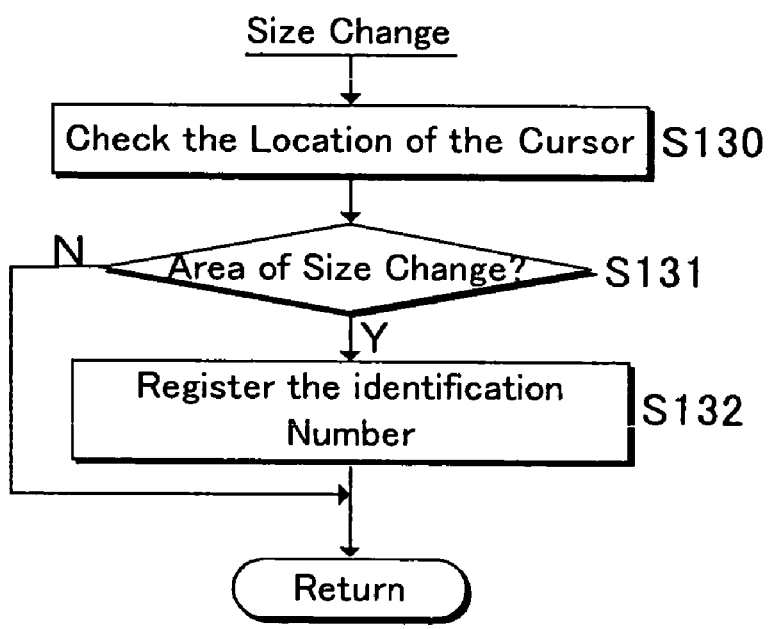
FIG. 32 is a flowchart showing the process flow of the size change process of step S5 of FIG. 20.

FIG. 32 is a flowchart showing the process flow of the size change process of step S5 of FIG. 20. As illustrated in FIG. 32, the CPU 201 checks the location of the cursor 107 (the target point of the operation article 150) in step S130. When the cursor 107 exists in the area in which any one of the size selective objects 104 to 106 is displayed, the CPU 201 proceeds to step S132, otherwise proceeds to step S6 of FIG. 20 (step S131).

In step S132, the CPU 201 registers the identification number of the size selective object appointed by the cursor 107.

Figure 33:
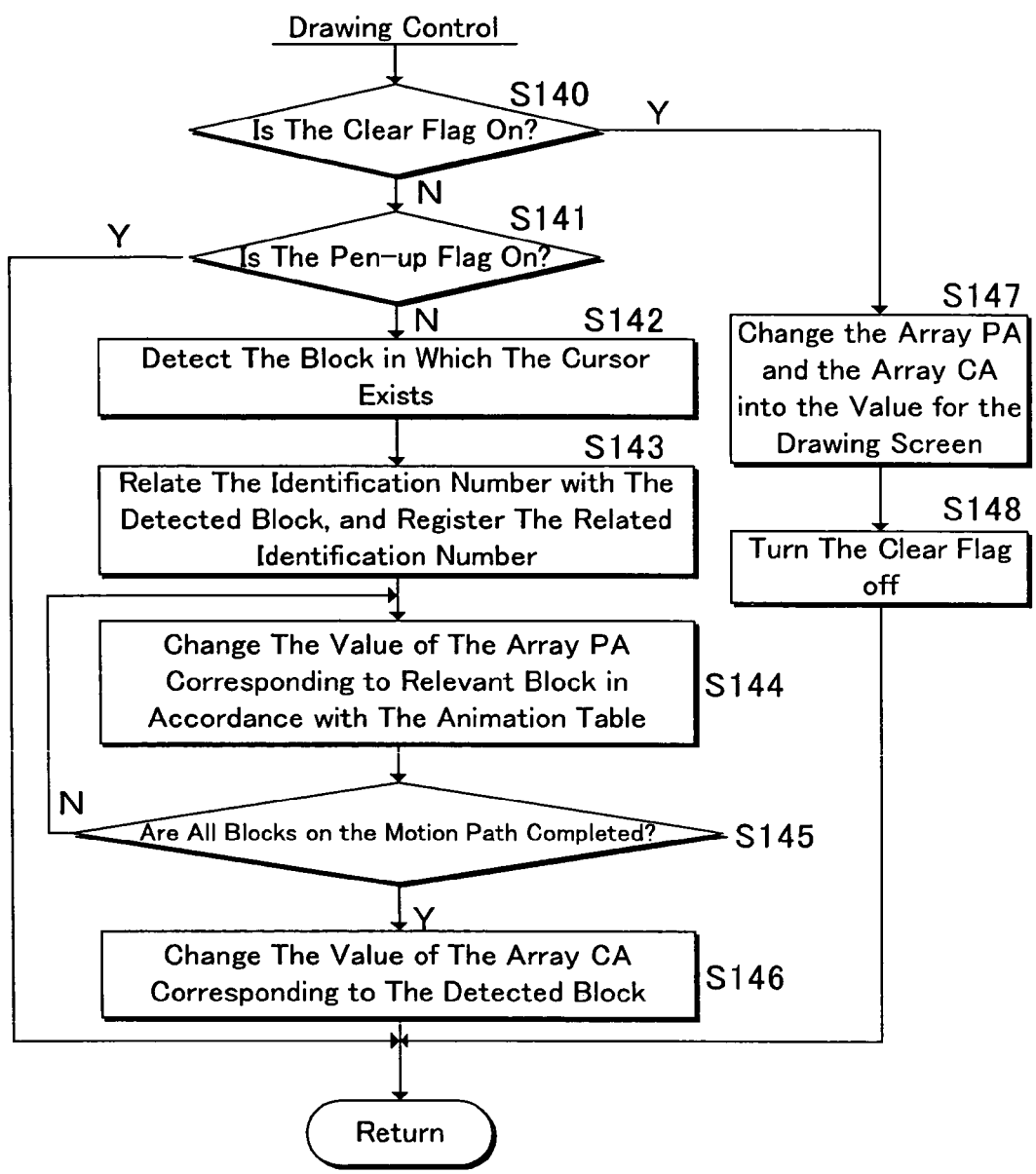
FIG. 33 is a flowchart showing the process flow of the drawing control process in step S7 of FIG. 20.

FIG. 33 is a flowchart showing the process flow of the drawing control process in step S7 of FIG. 20. As illustrated in FIG. 33, the CPU 201 checks the clear flag in step S140. If the clear flag is on, the CPU 201 proceeds to step S147, otherwise proceeds to step S141. In step S147, the CPU 201 changes all values of the array PA and the array CA to the values for the blank drawing screen 120. In step S148, the CPU 201 turns the clear flag off.

On the other hand, the CPU 201 checks the pen-up flag in step S141. If the pen-up flag is off, the CPU 201 proceeds to step S142. In step S142, the CPU 201 detects the block "B" (refer to FIG. 13) where the drawing cursor 107 (the target point of the operation article 150) exists.

In step S143, the CPU 201 relates the identification number (refer to step S132 of FIG. 32) with the detected block "B", and registers the identification number related to the detected block "B".

In step S144, the CPU 201 changes the value of the array PA corresponding to the relevant block "B" in accordance with the animation table (refer to FIG. 19) appointed by the storage location information of the animation table (refer to FIG. 18) associated with the registered identification number.

Then, if the CPU 201 changes the values of the array PA corresponding to all blocks "B" on the motion path of the cursor 107, the CPU 201 proceeds to step S146, otherwise proceeds to step S144 (step S145).

In step S146, the CPU 201 changes the color palette information of the array CA corresponding to the block "B" which is currently detected in step S142 to the color palette information which is registered in the color change process.

In above explanation, the pen-down state is when the distance "L" between the image sensor 43 and the operation article 150 is L<La. On the other hand, the pen-up state is when the distance "L" between the image sensor 43 and the operation article 150 is L≧La. In other words, when the count value corresponding to the area of the operation article (refer to step S92 of FIG. 29) is larger than the predetermined value "k", it is assumed to be pen-down state. On the other hand, if the count value does not exceed the predetermined value "k", it is assumed to be pen-up state. However, this is only one of the examples. Therefore, for example, it is possible to distinguish between the pen-up state and the pen-down state by the following way.

When the distance "L" between the image sensor 43 and the operation article 150 is L≧Ll, it is assumed to be the pen-up state. Once the state becomes pen-up, the state does not become pen-down unless the distance "L" becomes L<Ls. Incidentally, the relation between "Ls" and "Ll" is Ls<L1. In addition, once the state becomes pen-down, the state is maintained until the distance "L" becomes L<L1. These can be explained in another way of saying as follows.

When the count value (refer to step S92 of FIG. 29) corresponding to the area of the operation article 150 does not exceed the predetermined value "ks", it is assumed to be pen-up state. Once the state becomes pen-up, the state does not become pen-down unless the count value exceeds the predetermined value "kl". Incidentally, the relation between "ks" and "kl" is ks<k1. In addition, once the state becomes pen-down, the state is maintained until the count value becomes more than the predetermined value "ks".

Next, a modification of this embodiment will be explained. Both the above embodiment and the modification have the overall configuration of FIG. 1, the operation article 150 described in FIG. 2 to FIG. 4, the imaging unit 13 of FIG. 5, the electrical structure described in FIG. 6 to FIG. 10, the sprite of FIG. 12, the background screen 140 in FIG. 13, the program and data of FIG. 14, and the target extracting described in FIG. 15 to FIG. 17 in common. In addition, the process from FIG. 20 to FIG. 32 is performed in common. In what follows, differences between them are explained.

Figure 34:
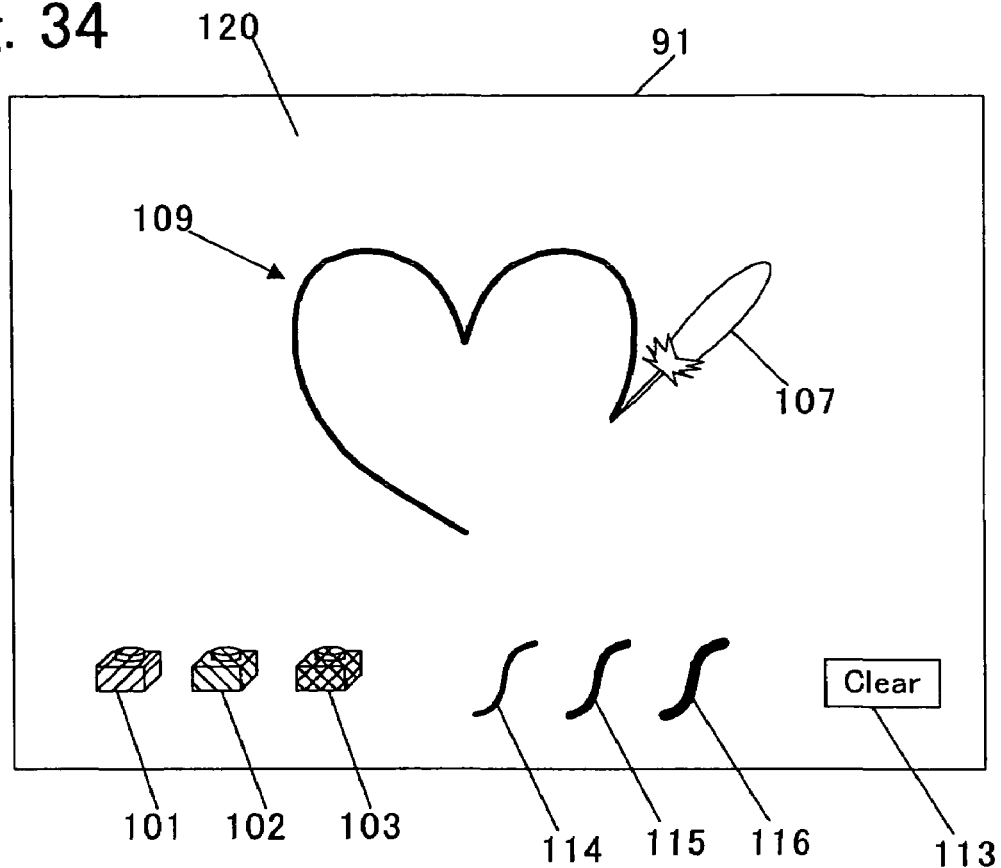
FIG. 34 is a view showing drawing by the modification of this embodiment.

FIG. 34 is a view showing a drawing by the modification of this embodiment. As illustrated in FIG. 34, when the user 94 operates the operation article 150 to move the drawing cursor 107, a line 109 is displayed on the motion path of the drawing cursor 107 in this modification.

Since the drawing cursor 107 moves follows motion of the operation article 150, the motion path of the drawing cursor 107 is similar to the motion path of the operation article 150. Therefore, the user 94 can draw almost same lines on the screen as lines drawn in real space by the operation article 150. Incidentally, "pen-up" and "pen-down" are used in same way as above mentioned embodiment.

The size selective objects 114 to 116 are used to change the width of the line 109. When the user 94 brings the cursor 107 to the area in which the size selective object 114 is displayed, the line 109 becomes narrow. When the user 94 brings the cursor 107 to the area in which the size selective object 115 is displayed, the line 109 becomes medium width. When the user 94 brings the cursor 107 to the area in which the size selective object 116 is displayed, the line 109 becomes wide.

In this modification, the CPU 201 also registers the identification number of the size selective object which the cursor 107 enters when the cursor 107 is brought to any one of the size selective object 114 to 116 (stores in the inner memory 207). One of the identification numbers of the size selective object 104 to 106 is registered as a default.

Figure 35:
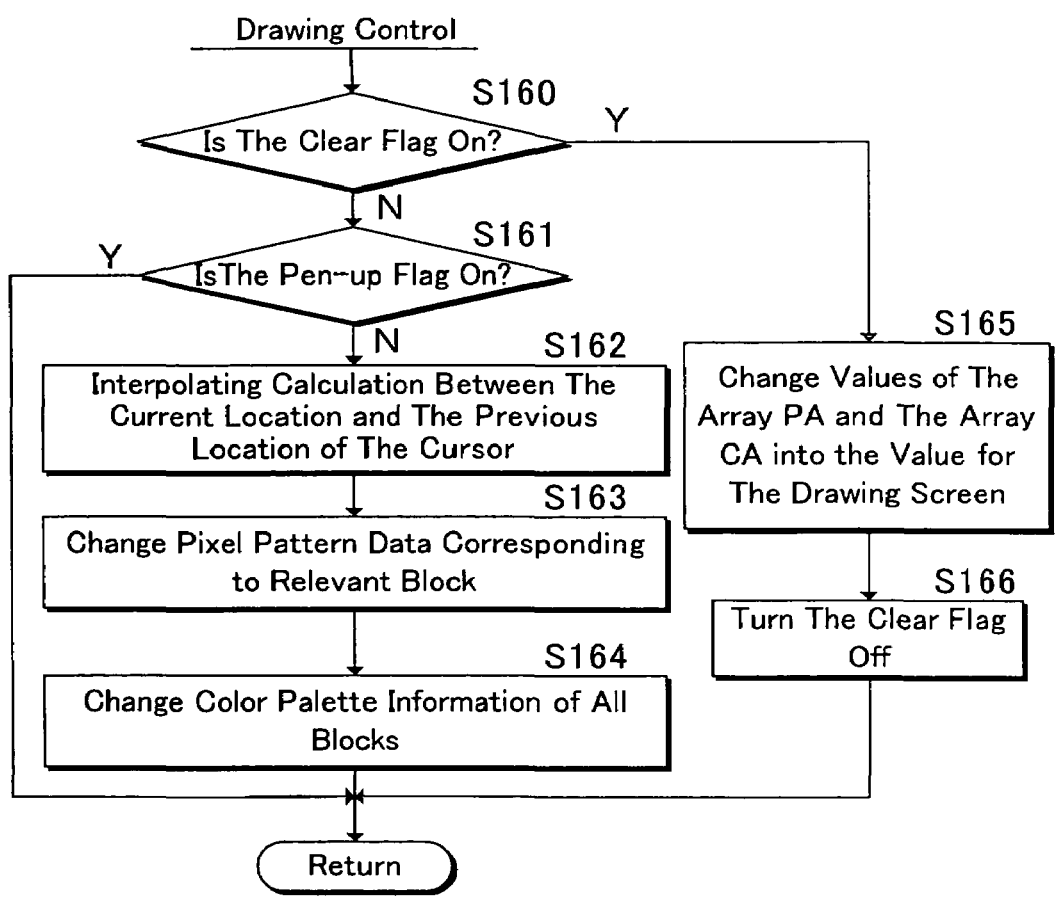
FIG. 35 is a flowchart showing the process flow of drawing control process of step S7 in FIG. 20 in the modified example.

FIG. 35 is a flowchart showing the process flow of drawing process of step S7 in FIG. 20 in the modified example. As illustrated in FIG. 35, the CPU 201 checks the clear flag in step S160. If the clear flag is on, the CPU 201 proceeds to step S165, otherwise proceeds to step S161. In step S165, the CPU 201 changes values of the array PA and the array CA corresponding to all blocks "B" to values for the initial drawing screen 120 without a line 109. In step S166, the CPU 201 turns the clear flag off.

On the other hand, the CPU 201 checks the pen-up flag in step S161. If the pen-up flag is off, the CPU 201 proceeds to step S162. In step S162, the CPU 201 performs interpolating calculation between the current location (Ax[M],Ay[M]) and the previous location (Ax[M−1],Ay[M−1) of the drawing cursor 107 (the target point of the operation article 150).

In step S163, the CPU 201 changes pixel pattern data of relevant block "B" in accordance with the result of the interpolating calculation and the identification number registered in the size change process. In other words, the CPU 201 changes the pixel pattern data of the relevant block "B" in order to draw the line 109 connecting the current location (Ax[M],Ay[M]) and the previous location (Ax[M−1],Ay[M−1]) of the cursor 107. In this case, the CPU 201 changes the pixel pattern data of the relevant block "B" in order to draw the line 109 whose width corresponds to the identification number registered in the size change process.

In step S164, the CPU 201 changes the color palette information of the array CA corresponding to all blocks "B" to the color palette information registered in the color change process. In this way, the color of the line 109 drawn previously is also changed.

As has been discussed above, in this embodiment and the modified example, the operation article 150 is captured by intermittently irradiating infrared light to the operation article 150 to derive the state information of the operation article 150. Accordingly, it is not necessary to provide the operation article 150 with a power supply circuit and electric circuits in order to derive the state information of the operation article 150. Therefore, it is possible to display the image corresponding to the motion path of the cursor 107 (the following object) by operating the simple constructed operation article 150 in the air (refer to FIG. 11 and FIG. 34). In other words, since cursor 107 follows the motion of the operation article 150, it is possible to display the image corresponding to the motion path of the operation article 150 on the screen. In addition, it is possible to improve operationality and reliability of the operation article 150 and also reduce the cost.

Moreover, in accordance with this embodiment, the motion path of the cursor 107 is expressed by a plurality of star images 108. In addition, the star images 108 are animated (refer to FIG. 11). In this way, it is possible to display the decorated motion path of the cursor 107.

In accordance with the modified example, the motion path of the cursor 107 is expressed by a line. In this way, the user 94 can draw lines arbitrary by only operating the operation article 150 in the air.

Furthermore, in this embodiment and the modified example, the drawing process is performed when the area information of the operation article 150 exceeds the predetermined value "k", in other words, the distance between the operation article 150 and the image sensor 43 becomes below the constant value "La" (pen-down state) On the other hand, the drawing process is not performed when the area information of the operation article 150 falls below the predetermined value "k", in other words, the distance between the operation article 150 and the image sensor 43 becomes larger than the constant value "La" (pen-up state). In this way, the user 94 can control drawing and undrawing operation by bringing the operation article 150 closer or further to the image sensor 43. In other words, the user 94 can control drawing and undrawing operation intuitively as if the user 94 were drawing with an ordinal pen.

Furthermore, in this embodiment and the modified example, it is possible to control the state between pen-up and pen-down in the following way. The drawing process is not performed (the state does not become pen-down) until the area information of the operation article 150 exceeds not the predetermined value "ks" but the predetermined value "kl" which is larger than the predetermined value "ks", once the area information becomes smaller than the predetermined value "ks" and the state becomes pen-up. In other words, the state does not become pen-down unless the operation article 150 is brought to the border "Ls" corresponding to the predetermined value "kl" which is closer to the image sensor 43 than the border "Ll" corresponding to the predetermined value "ks" once the state becomes pen-up by the predetermined value "ks". In this way, since the pen-up state and the pen-down state are not divided by only one border, it is possible to avoid malfunction when the operation article 150 is operated around a border. In other words, in case where the pen-up state and the pen-down state are divided by only one border, the state might keep changing between drawing operation and undrawing operation when the user 94 operates the operation article 150 around the border.

Incidentally, the present invention is not limited to the above embodiments, and a variety of variations and modifications may be effected without departing from the spirit and scope thereof, as described in the following exemplary modifications.

(1) In the above description, only one operation article 150 is used. However, it is possible to provide several operation articles and enjoy drawing with several people.

(2) In the above description, the operation article 150 which provides the stick 152 and the reflecting ball 151 is used as an operation article. However, if the operation article is provided with a reflecting portion, it is not limited to the operation article 150.

(3) In the above description, the coordinate of the target point of the operation article 150 is derived in the manner described in FIG. 17A to FIG. 17D. However, it is possible to define the coordinate of the pixel having the maximum luminance value exceeding the predetermined threshold value "Th" as a coordinate of the target point.

(4) In the above description, the star image 108 and the line 109 are displayed on the motion path of the cursor 107. However the image is not limited thereto and it is possible to display any image on the motion path.

(5) In the above description, the color and size of the star image 108 and the line 109 can be changed. It is also possible to change the image displayed on the motion path of the cursor 107.

(6) In the above description, all star images 108 and lines 109 are deleted by the clear button 113. However, it is possible to provide a cursor for deleting to delete a part of the star images 108 and lines 109.

(7) In the above description, the CPU 201 calculates the coordinate (i.e. location information) of the target point and the area of the operation article 150. This is one of the examples of state information of the operation article 150. Therefore, the CPU 201 can calculate other type of state information on the basis of the image signal from the image sensor 43, and perform various processes on the basis of the calculated state information.

The state information could be, for example, any one of speed information, movement direction information, movement distance information, velocity vector information, acceleration information, motion path information, area information and positional information, or a combination thereof.

(8) While any appropriate processor can be used as the high speed processor 200 of FIG. 6, it is preferred to use the high speed processor of which patent applications the applicant has been filed. The details of this high speed processor are disclosed, for example, in Jpn. unexamined patent publication No. 10-307790 and U.S. Pat. No. 6,070,205 corresponding thereto.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A drawing apparatus comprising:
   an image capturing device operable to generate an image signal by capturing an image of an operation article operated in the air;
   a state information calculating unit operable to calculate state information of said operation article on the basis of said image signal;
   a following object control unit operable to control display of a following object in accordance with said state information of said operation article so that said following object follows motion of said operation article;
   a drawing control unit operable to control drawing on a display device on the basis of a motion path of said following object;
   a stroboscope operable to direct light onto said operation article at a predetermined interval, wherein said image capturing device generates a lighted image signal and a non-image signal by capturing images of said operation article respectively when said stroboscope is lighted and non-lighted; and
   a differential signal generating unit operable to generate a differential signal between said lighted image signal and said non-lighted image signal, wherein said state information calculating unit calculates said state information of said operation article on the basis of said differential signal.

2. The drawing apparatus as claimed in claim 1 wherein said drawing control unit displays a plurality of images along the motion path of said following object such that the plurality of images remain displayed on the display device.

3. The drawing apparatus as claimed in claim 2 wherein said drawing control unit performs animation of said plurality of images.

4. The drawing apparatus as claimed in claim 1 wherein said drawing control unit displays the motion path of said following object by a line.

5. The drawing apparatus as claimed in claim 1 wherein said drawing control unit controls drawing operation and undrawing operation on the basis of an area information obtained as one of said state information, wherein the area information includes a value corresponding to a distance between the image capturing device and the operation article.

6. The drawing apparatus as claimed in claim 5 wherein said drawing control unit performs the drawing operation when said area information exceeds a predetermined threshold value, and does not perform the drawing operation when said area information falls below the predetermined threshold value.

7. The drawing apparatus as claim in claim 5 wherein said drawing control unit does not perform the drawing operation when said area information falls below a first predetermined threshold value, and once said area information falls below the first predetermined threshold value, said drawing control unit does not perform the drawing operation until said area information exceeds a second predetermined threshold value, and wherein said first predetermined threshold value is smaller than said second predetermined threshold value.

8. The drawing apparatus as claimed in claim 1 wherein said state information calculated by said state information calculation unit is location information of said operation article on said display device.

9. An operation article operated by a user of said drawing apparatus as claimed in claim 1, comprising:
   a reflecting portion operable to retroreflect light.

10. A drawing system comprising:
    an operation article operated by a user in the air;
    an image capturing unit operable to generate an image signal by capturing an image of said operation article;
    a state information calculating unit operable to calculate state information of said operation article on the basis of said image signal;
    a following object control unit operable to control display of a following object in accordance with said state information of said operation article so that said following object follows motion of said operation article;
    a drawing control unit operable to control drawing on a display device on the basis of a motion path of said following object;
    a stroboscope operable to direct light onto said operation article at a predetermined interval, wherein said image capturing device generates a lighted image signal and a non-image signal by capturing images of said operation article respectively when said stroboscope is lighted and non-lighted; and
    a differential signal generating unit operable to generate a differential signal between said lighted image signal and said non-lighted image signal, wherein said state information calculating unit calculates said state information of said operation article on the basis of said differential signal.

11. A physical computer-readable medium having a drawing program stored thereon, wherein the drawing program enables a computer to perform a process, said process comprising:

a step of directing light onto an operation article at a predetermined interval;

a step of capturing an image of said operation article with and without light emitted from a stroboscope and generating a lighted and a non-lighted image signal which represent image signals corresponding to said operation article with and without light emitted from said stroboscope;

a step of generating a differential signal between said lighted image signal and said non-lighted image signal;

a step of calculating state information of said operation article based on said differential signal;

a step of controlling display of a following object which moves as said operation article moves in accordance with said state information of said operation article; and a step of controlling drawing on a display device on the basis of a motion path of said following object.

12. A computer-readable medium having a drawing program stored thereon, wherein the drawing program enables a computer to perform a process, said process comprising:

generating an image signal by capturing an image of an operation article operated in the air;

calculating state information of said operation article based on said image signal;

controlling display of a following object which follows motion of said operation article in accordance with said state information of said operation article;

controlling drawing on a display device on the basis of a motion path of said following object;

displaying said drawing on said display device;

directing light onto said operation article at a predetermined interval, wherein generating the image signal by capturing the image of said operation article includes:

generating a lighted image signal by capturing the image of said operation article when said stroboscope is lighted, and generating a non-lighted image signal by capturing the image of said operation article when said stroboscope is non-lighted; and generating a differential signal between said lighted image signal and said non-lighted image signal, wherein said state information of said operation article is calculated on the basis of said differential signal.

\* \* \* \* \*